US012287392B2

(12) United States Patent
Noda

(10) Patent No.: US 12,287,392 B2
(45) Date of Patent: Apr. 29, 2025

(54) INFORMATION TRANSMISSION METHOD, INFORMATION PROCESSING METHOD, AND MOBILE RECEPTION TERMINAL

(71) Applicant: Socionext Inc., Kanagawa (JP)

(72) Inventor: Kazuyoshi Noda, Yokohama (JP)

(73) Assignee: SOCIONEXT INC., Kanagawa (JP)

( * ) Notice: Subject to any disclaimer, the term of this patent is extended or adjusted under 35 U.S.C. 154(b) by 434 days.

(21) Appl. No.: 17/680,494

(22) Filed: Feb. 25, 2022

(65) Prior Publication Data

US 2022/0283282 A1     Sep. 8, 2022

(30) Foreign Application Priority Data

Mar. 3, 2021   (JP) .................. 2021-033328

(51) Int. Cl.
   *G01S 13/34*      (2006.01)
   *G01S 7/295*      (2006.01)
   *G01S 13/75*      (2006.01)

(52) U.S. Cl.
   CPC .......... *G01S 13/341* (2013.01); *G01S 7/2955* (2013.01); *G01S 13/755* (2013.01)

(58) Field of Classification Search
   CPC .... G01S 13/003; G01S 13/341; G01S 13/755; G01S 13/951; G01S 7/2955; G16B 30/00; G16B 45/00; G16B 50/00; G16B 50/30
   See application file for complete search history.

(56) References Cited

U.S. PATENT DOCUMENTS

| | | | | |
|---|---|---|---|---|
| 7,782,247 | B1* | 8/2010 | VanLaningham | G01S 13/003 342/146 |
| 2002/0089450 | A1* | 7/2002 | Dowdle | G01S 5/0273 342/453 |
| 2007/0041432 | A1* | 2/2007 | Reial | H04B 1/7113 375/148 |
| 2020/0068435 | A1* | 2/2020 | Zhang | H04L 27/2605 |
| 2021/0373147 | A1* | 12/2021 | Moon | G01S 13/534 |

(Continued)

FOREIGN PATENT DOCUMENTS

| | | |
|---|---|---|
| JP | 2002-296348 A | 10/2002 |
| JP | 2005-148013 A | 6/2005 |

(Continued)

OTHER PUBLICATIONS

Kawamura et al., "Water vapor estimation using digital terrestrial broadcasting waves," Radio Science, vol. 52, Issue 3 Mar. 2017 pp. 367-377.

(Continued)

*Primary Examiner* — Timothy X Pham
(74) *Attorney, Agent, or Firm* — Rimon P.C.

(57) ABSTRACT

An information transmission method of a mobile reception terminal that is capable of connecting to a server over a network and capable of receiving a direct wave and a reflected wave of radio waves transmitted by a transmission station that has a fixed position and transmits radio waves of a same modulation scheme continuously or periodically, includes: creating a delay profile of reception of the direct wave and the reflected wave that indicates a time difference between the direct wave and the reflected wave; and transmitting the delay profile to the server over the network.

11 Claims, 18 Drawing Sheets

(56) References Cited

U.S. PATENT DOCUMENTS

2023/0262643 A1* 8/2023 Zach ................ H04W 24/10
                                            455/456.1

FOREIGN PATENT DOCUMENTS

JP          2010-147519 A      7/2010
JP          2017-207459 A      11/2017

OTHER PUBLICATIONS

Kawanura et al., "Water Vapor Estimation using Digital Terrestrial Broadcasting Waves," Journal of National Institute of Information and Communications Technology vol. 65, No. 1 (2019) pp. 15-19.
Kawamura et al., "Water vapor estimation using digital terrestrial broadcasting waves," Radio Science, vol. 52, Issue 3 Mar. 2017 pp. 367-477.
Notice of Reasons for Refusal dated Aug. 20, 2024 issued in the corresponding Japanese Patent Application No. 2021-033328, with English machine translation.

* cited by examiner

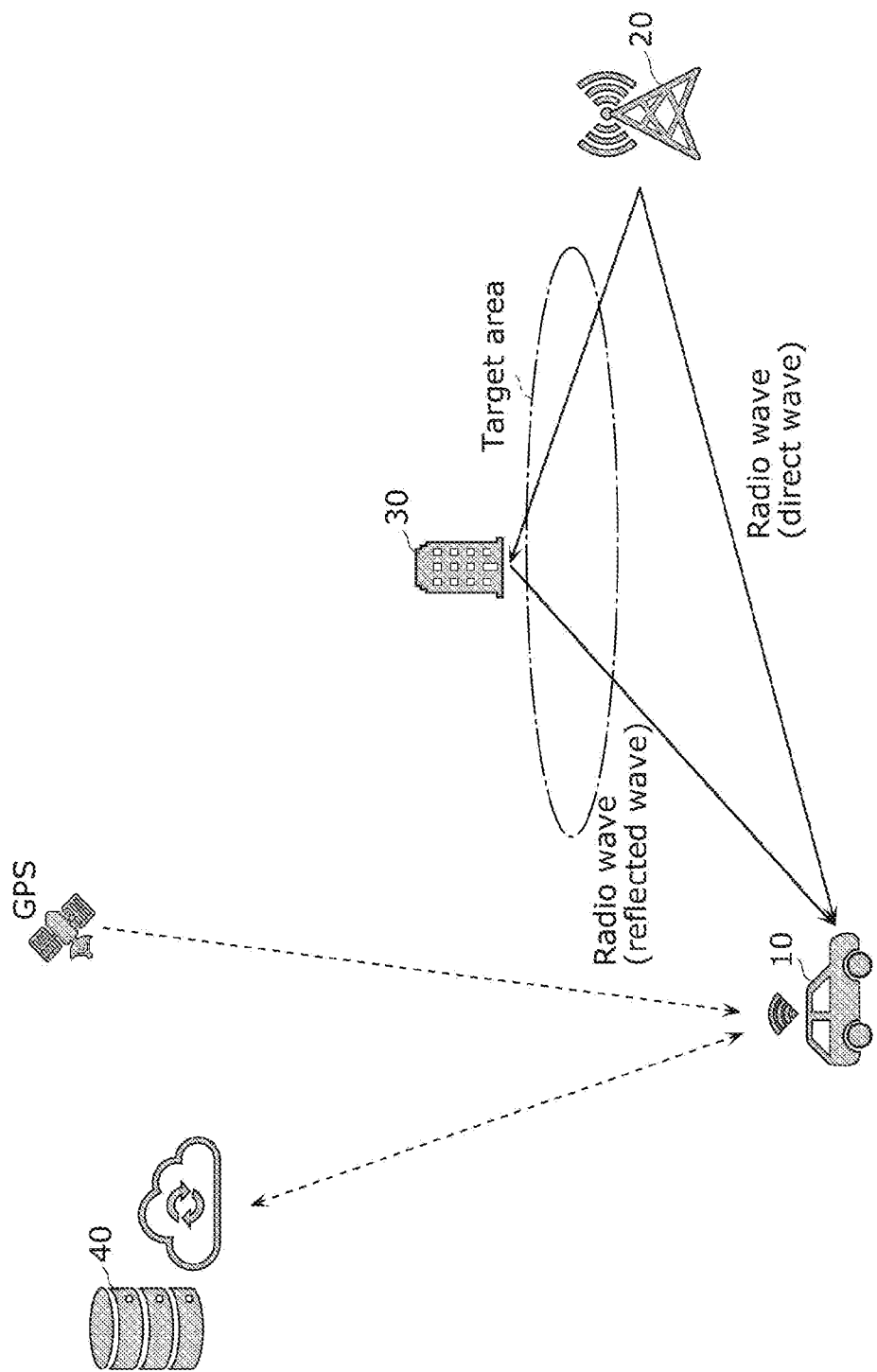

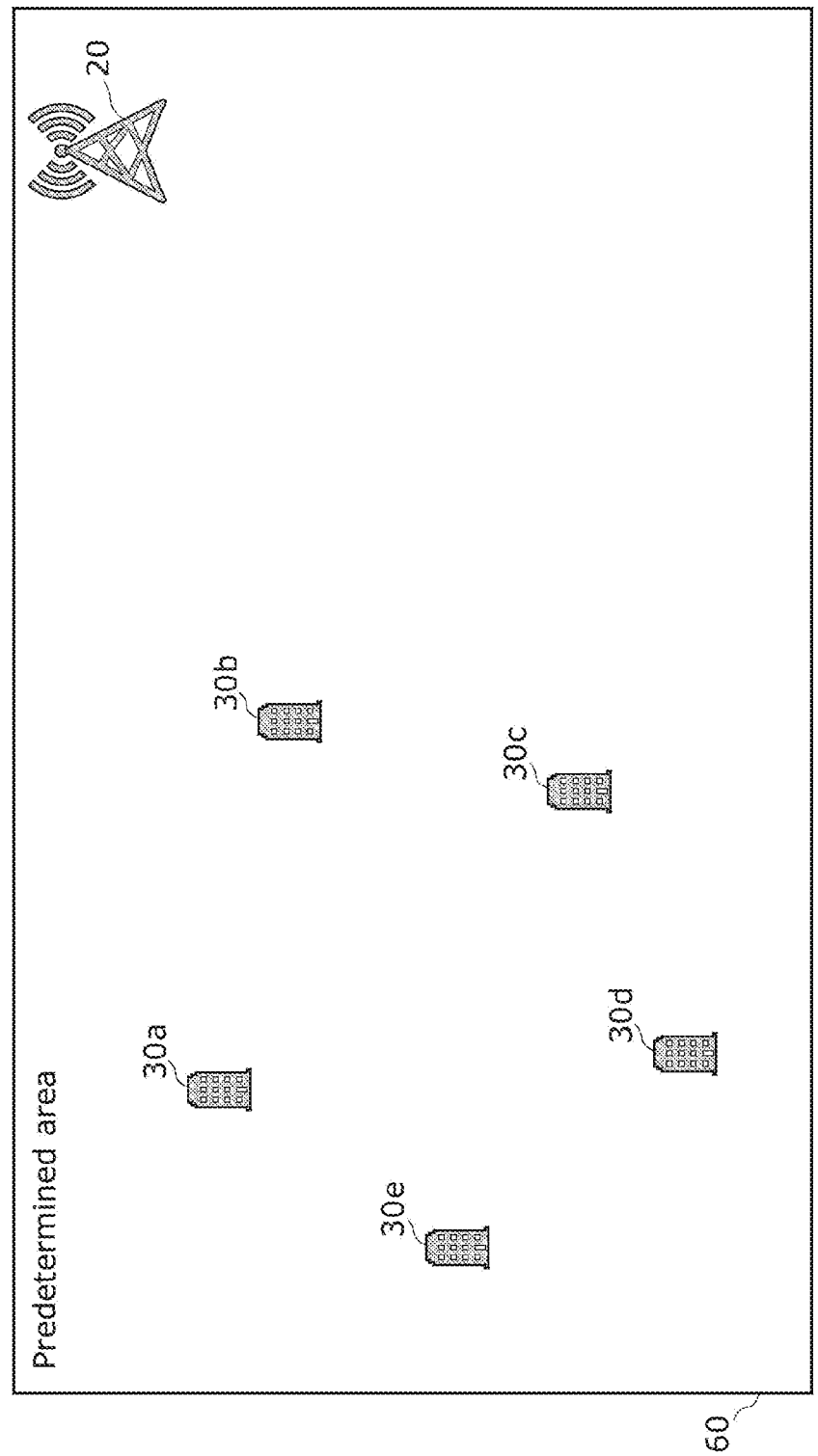

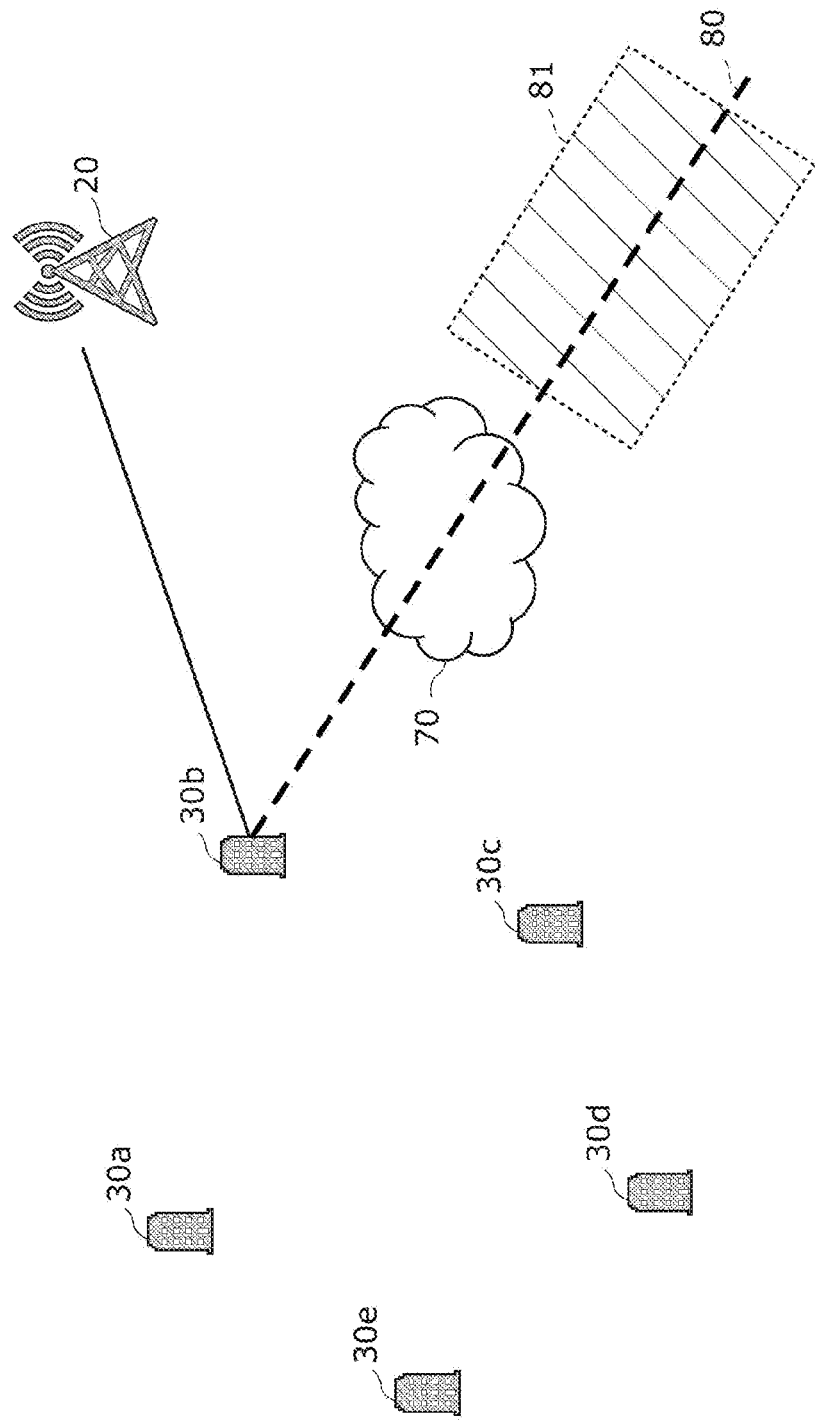

INFORMATION TRANSMISSION METHOD, INFORMATION PROCESSING METHOD, AND MOBILE RECEPTION TERMINAL

CROSS REFERENCE TO RELATED APPLICATIONS

The present application is based on and claims priority of Japanese Patent Application No. 2021-033328 filed on Mar. 3, 2021. The entire disclosure of the above-identified application, including the specification, drawings, and claims is incorporated herein by reference in its entirety.

FIELD

The present disclosure relates to an information transmission method, an information processing method, and a mobile reception terminal.

BACKGROUND

A technique for estimating an amount of water vapor on propagation paths of radio waves using digital terrestrial broadcasting has been proposed (for example, see Non Patent Literature (NPL) 1).

In the technique of NPL 1, a radio wave arriving directly from a broadcast station (i.e., a direct wave) and a reflected wave of a radio wave from the broadcast station that has reflected off a structure or the like are received by a reception terminal, and the amount of water vapor on the path of the reflected wave is estimated from reception information about the direct wave and the reflected wave from the reception terminal.

CITATION LIST

Non Patent Literature

NPL 1: S. Kawamura, H. Ohta, H. Hanado, M. K. Yamamoto, N. Shiga, K. Kido, S. Yasuda, T. Goto, R. Ichikawa, J. Amagai, K. Imamura, M. Fujieda, H. Iwai, S. Sugitani, and T. Iguchi "Water vapor estimation using digital terrestrial broadcasting waves," Radio Science, Volume 52, Issue 3 Mar. 2017 Pages 367-377

SUMMARY

Technical Problem

Unfortunately, with the technique disclosed in NPL 1, the broadcast station transmitting the digital terrestrial broadcasting waves, the reception terminal, and the structure (reflective object) that reflects the radio waves are required to be in fixed locations. This restricts the propagation paths that can be used in the estimation of the amount of water vapor, limiting the area in which the amount of water vapor can be measured.

However, if the reception terminal were to be mobilized by placing it in or on, for example, a vehicle, the reflective object that reflects the radio waves would no longer be in a fixed location, whereby the positional relationship between the reflective object, the reception terminal, and the broadcast station would no longer be fixed as required. Since the technique disclosed in NPL 1 cannot identify the position of the reflective object, the amount of water vapor cannot be estimated in such cases.

The present disclosure was conceived in view of the above, and has an object to provide an information transmission method and a mobile reception terminal capable of transmitting information that can identify the position of a reflective object that reflected a radio wave transmitted from a transmission station such as a broadcast station. The present disclosure also has an object to provide an information processing method that can identify the position of a reflective object that reflected a radio wave transmitted from a transmission station such as a broadcast station and can estimate an amount of water vapor, even when a mobile reception terminal is used.

Solution to Problem

In order to achieve the objects described above, an information transmission method according to one aspect of the present disclosure is a method of a mobile reception terminal that is capable of connecting to a server over a network and capable of receiving a direct wave and a reflected wave of radio waves transmitted by a transmission station that has a fixed position and transmits radio waves of a same modulation scheme continuously or periodically, and includes: creating a delay profile of reception of the direct wave and the reflected wave, the delay profile indicating a time difference between the direct wave and the reflected wave; and transmitting the delay profile to the server over the network.

In order to achieve the objects described above, a mobile reception terminal according to one aspect of the present disclosure is capable of connecting to a server over a network and capable of receiving a direct wave and a reflected wave of radio waves transmitted by a transmission station that has a fixed position and transmits radio waves of a same modulation scheme continuously or periodically, and includes a processor and memory. Using the memory, the processor: creates a delay profile of reception of the direct wave and the reflected wave, the delay profile indicating a time difference between the direct wave and the reflected wave; and transmits the delay profile to the server over the network.

In order to achieve the objects described above, an information processing method according to one aspect of the present disclosure is a method of a server that is capable of connecting over a network to mobile reception terminals capable of receiving a direct wave and a reflected wave of radio waves transmitted by a transmission station that has a fixed position and transmits radio waves of a same modulation scheme continuously or periodically, and includes: obtaining, from each mobile reception terminal among the mobile reception terminals, information related to a current position at which the mobile reception terminal received the direct wave and the reflected wave, and a delay profile indicating a time difference of arrival between the direct wave and the reflected wave; and deriving an ellipse on which a reflective object that reflected the reflected wave may be present from each of the delay profiles and the information related to the current positions of the mobile reception terminals obtained in the obtaining, calculating intersections of the ellipses obtained in connection with the delay profiles, and when there are two or more ellipses among the ellipses that intersect only at one intersection among the intersections, identifying the one intersection as a position of a reflective object.

General or specific aspects of the present disclosure may be realized as a device or apparatus, system, method, integrated circuit, computer program, or any given combination thereof.

Advantageous Effects

With the information transmission method and the like according to the present disclosure, it is possible to transmit information that can identify the position of a reflective object that reflected a radio wave transmitted from a transmission station such as a broadcast station. Furthermore, with the information processing method according to the present disclosure, it is possible to identify the position of a reflective object that reflected a radio wave transmitted from a transmission station such as a broadcast station and estimate an amount of water vapor, even when a mobile reception terminal is used.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 1 illustrates one example of the overall system according to an embodiment of the present disclosure.

FIG. 12 illustrates one example of a map of positions of a plurality of reflective objects in a predetermined area according to an embodiment of the present disclosure.

FIG. 13 schematically illustrates a process for estimating an amount of water vapor according to an embodiment of the present disclosure.

DESCRIPTION OF EMBODIMENT

Figure 2A:
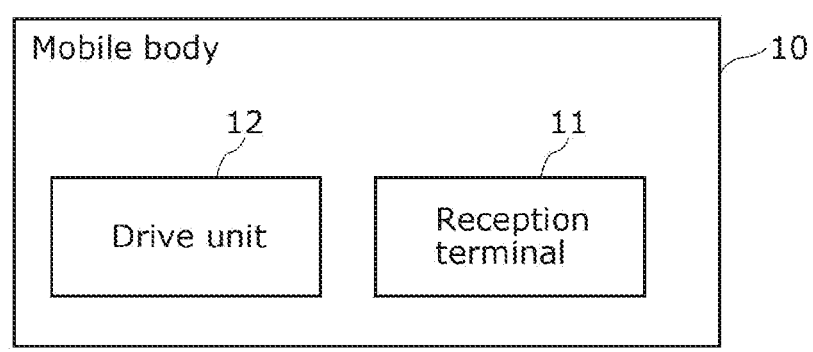
FIG. 2A is a block diagram illustrating one example of a configuration of the mobile body illustrated in FIG. 1.

An information transmission method according to one aspect of the present disclosure is a method of a mobile reception terminal that is capable of connecting to a server over a network and capable of receiving a direct wave and a reflected wave of radio waves transmitted by a transmission station that has a fixed position and transmits radio waves of a same modulation scheme continuously or periodically, and includes: creating a delay profile of reception of the direct wave and the reflected wave, the delay profile indicating a time difference between the direct wave and the reflected wave; and transmitting the delay profile to the server over the network.

With this, it is possible to transmit information that can identify the position of a reflective object that reflected a radio wave transmitted from a transmission station such as a broadcast station.

Here, the delay profile is used by the server to calculate a distance between the mobile reception terminal and a reflective object that reflected the reflected wave based on the time difference.

Moreover, the information transmission method may execute the transmitting at predetermined intervals.

For example, the information transmission method further includes identifying a position of the mobile reception terminal, the position corresponding to the reception of the direct wave and the reflected wave. The transmitting includes transmitting, to the server along with the delay profile, information related to the position identified in the identifying and information related to reception times of the direct wave and the reflected wave.

For example, the information transmission method further may further include: obtaining instruction information including a reception area of the direct wave and the reflected wave from the server; determining whether the position identified in the identifying is within the reception area included in the instruction information; and receiving the direct wave and the reflected wave when the determining determines that the position is within the reception area. The creating includes creating the delay profile of the reception of the direct wave and the reflected wave received in the receiving.

For example, the information transmission method further includes: obtaining instruction information including a reception area of the direct wave and the reflected wave from the server; estimating a future position at which the mobile reception terminal will be within a predetermined period of time based on a current position of the mobile reception terminal; determining whether the future position estimated in the estimating is within the reception area included in the instruction information; and receiving the direct wave and the reflected wave once the current position of the mobile reception terminal is within the reception area, when the determining determines that the future position is within the reception area. The creating may include creating the delay profile of the reception of the direct wave and the reflected wave received in the receiving.

For example, the transmission station transmits the radio waves of the same modulation scheme using orthogonal frequency division multiplexing (OFDM) as the modulation scheme.

An information processing method according to one aspect of the present disclosure is a method of a server that is capable of connecting over a network to mobile reception terminals capable of receiving a direct wave and a reflected wave of radio waves transmitted by a transmission station that has a fixed position and transmits radio waves of a same modulation scheme continuously or periodically, and includes: obtaining, from each mobile reception terminal among the mobile reception terminals, information related to a current position at which the mobile reception terminal received the direct wave and the reflected wave, and a delay profile indicating a time difference of arrival between the direct wave and the reflected wave; and deriving an ellipse on which a reflective object that reflected the reflected wave may be present from each of the delay profiles and the information related to the current positions of the mobile reception terminals obtained in the obtaining, calculating intersections of the ellipses obtained in connection with the delay profiles, and when there are two or more ellipses among the ellipses that intersect only at one intersection among the intersections, identifying the one intersection as a position of a reflective object.

With this, it is possible to identify the position of a reflective object that reflected a radio wave transmitted from a transmission station such as a broadcast station.

For example, the obtaining includes obtaining, along with the delay profile, information related to a time at which the mobile reception terminal was at the current position at which the mobile reception terminal received the direct wave and the reflected wave.

For example, the deriving may further include identifying positions of reflective objects that are mutually different, each of the reflective objects being the reflective object, and the information processing method may further include creating a map of the positions of the reflective objects per predetermined area.

For example, the information processing method may further include: determining a target area; selecting, from among the reflective objects, a single reflective object that is within the predetermined area including the target area, using the map created in the creating; determining an area extending along a line connecting a position of the single reflective object and the target area as the reception area; obtaining, from one or more of the mobile reception terminals within the reception area, one or more of the delay profiles of reception of the direct wave and the reflected wave by the one or more of the mobile reception terminals; and estimating an amount of water vapor in the target area using the one or more of the delay profiles obtained in the obtaining.

With this, it is possible to identify the position of a reflective object that reflected a radio wave transmitted from a transmission station such as a broadcast station and estimate an amount of water vapor, even when a mobile reception terminal is used.

A mobile reception terminal according to one aspect of the present disclosure is capable of connecting to a server over a network and capable of receiving a direct wave and a reflected wave of radio waves transmitted by a transmission station that has a fixed position and transmits radio waves of a same modulation scheme continuously or periodically, and includes a processor and memory. Using the memory, the processor: creates a delay profile of reception of the direct wave and the reflected wave, the delay profile indicating a time difference between the direct wave and the reflected wave; and transmits the delay profile to the server over the network.

With this, it is possible to transmit information that can identify the position of a reflective object that reflected a radio wave transmitted from a transmission station such as a broadcast station.

The embodiments described below show specific examples of the present disclosure. The numerical values, shapes, elements, steps, order of the steps, etc., indicated in the following embodiments are mere examples, and therefore do not intend to limit the present disclosure. Therefore, among elements in the following embodiments, those not recited in any of the broadest, independent claims are described as optional elements. Moreover, the content of the embodiments may be combined.

EMBODIMENT

Hereinafter, an embodiment will be described with reference to the figures.

1. Overall System

FIG. 1 illustrates one example of the overall system according to the present embodiment.

In the present embodiment, the overall system includes mobile body 10, transmission station 20 that transmits radio waves of the same modulation scheme continuously or periodically, reflective object 30 that reflects direct waves of the radio waves transmitted by transmission station 20, and server 40, as illustrated in FIG. 1.

First, mobile body 10 will be described.

1.1 Mobile Body 10

Figure 2B:
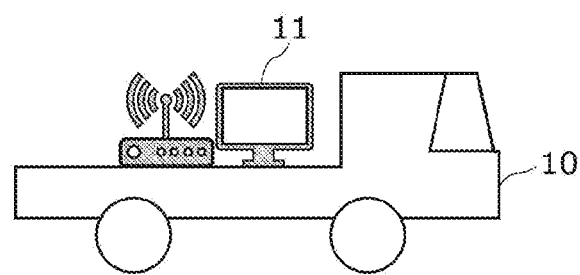
FIG. 2B illustrates another example of the mobile body illustrated in FIG. 1.

FIG. 2A is a block diagram illustrating one example of a configuration of mobile body 10 illustrated in FIG. 1. FIG. 2B illustrates another example of mobile body 10 illustrated in FIG. 1.

For example, mobile body 10 is a vehicle such as an automobile, and includes reception terminal 11 and drive unit 12, as illustrated in FIG. 2A. Mobile body 10 may internally include reception terminal 11. For example, the function of reception terminal 11 may be incorporated into a car navigation system in mobile body 10. Alternatively, mobile body 10 may externally include reception terminal 11. For example, as illustrated in FIG. 2B, reception terminal 11 may be provided on the bed or the like. So long as mobile body 10 is capable of moving while equipped with reception terminal 11, mobile body 10 may be a carriage on which reception terminal 11 is capable of being provided.

1.1.1. Drive Unit 12

Drive unit 12 is a functional unit that performs control for mobile body 10 to move, and when mobile body 10 is an automobile, performs all aspects of control for moving the automobile.

1.1.2 Reception Terminal 11

Reception terminal 11 is one example of a mobile reception terminal, and is provided in or on mobile body 10. For example, reception terminal 11 is implemented as a computer including, for example, a processor (microprocessor), memory, and a communication interface.

In the present embodiment, reception terminal 11 can connect to reception server 40 and is capable of communicating with server 40 over a network such as the internet, for example. Reception terminal 11 can obtain position information via global positioning system (GPS).

Figure 3:
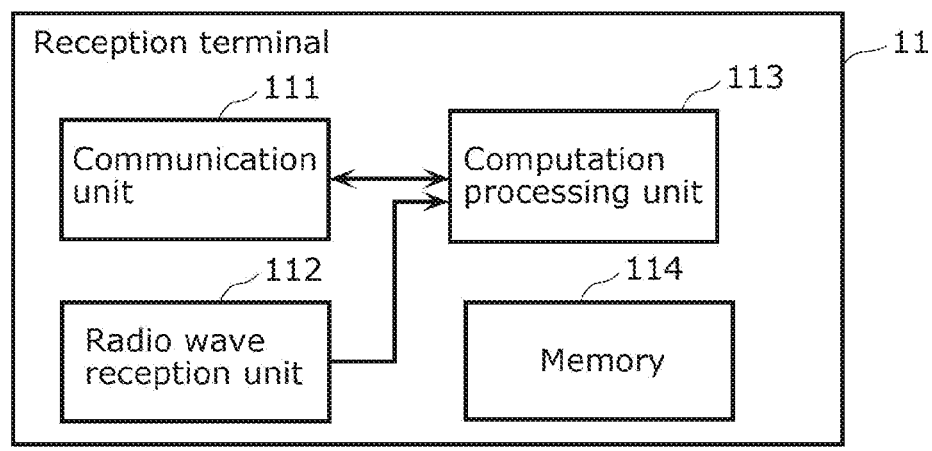
FIG. 3 is a block diagram illustrating one example of a configuration of a reception terminal according to an embodiment of the present disclosure.

FIG. 3 is a block diagram illustrating one example of a configuration of reception terminal 11 according to the present embodiment.

As illustrated in FIG. 3, reception terminal 11 includes communication unit 111, radio wave reception unit 112, computation processing unit 113, and memory 114, can receive reflected waves and direct waves of the radio waves transmitted by transmission station 20, and can connect to server 40 over a network.

1.1.2.1 Communication Unit 111

Communication unit 111 communicates with server 40 over a network.

For example, in the present embodiment, communication unit 111 transmits a delay profile created by computation processing unit 113 (to be described later) to at least server 40 over the network. Communication unit 111 may transmit the delay profile to server 40 along with information related to position and information related to time. For example, communication unit 111 obtains instruction information (to be described later) from server 40.

1.1.2.2 Radio Wave Reception Unit 112

Radio wave reception unit 112 receives radio waves transmitted by a GPS satellite. Radio wave reception unit 112 also receives direct waves and reflected waves of the radio waves transmitted by transmission station 20.

In the present embodiment, the timing of the reception of radio waves, i.e., a direct wave and a reflected wave of the radio waves transmitted by transmission station 20 by radio wave reception unit 112 may be controlled by computation processing unit 113. For example, radio wave reception unit 112 may be controlled so as to receive the radio waves at a timing indicated by a determination result of determination unit 1135. Radio wave reception unit 112 may be controlled so as to receive the radio waves at predetermined intervals.

Although radio wave reception unit 112 is exemplified as receiving, for example, digital terrestrial broadcasting radio waves in the present embodiment, radio wave reception unit 112 can receive any radio waves including a known pilot signal, and is not limited to receiving digital terrestrial broadcasting radio waves.

1.1.2.3 Computation Processing Unit 113

Figure 4:
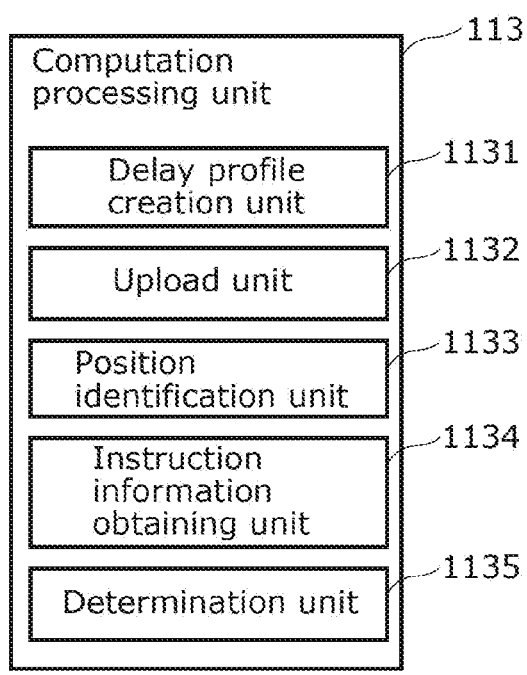
FIG. 4 is a block diagram illustrating one example of a functional configuration of the computation processing unit illustrated in FIG. 3.

FIG. 4 is a block diagram illustrating one example of a functional configuration of computation processing unit 113 illustrated in FIG. 3.

Computation processing unit 113 performs various processes using a CPU (not illustrated in FIG. 4) and memory 114. In the present embodiment, computation processing unit 113 includes delay profile creation unit 1131, upload unit 1132, position identification unit 1133, instruction information obtaining unit 1134, and determination unit 1135, as illustrated in FIG. 4.

1.1.2.3.1 Delay Profile Creation Unit 1131

Delay profile creation unit 1131 creates a delay profile of the reception of a direct wave and a reflected wave by radio wave reception unit 112, indicating the time difference between the direct wave and the reflected wave. Note that the delay profiles created by a plurality of reception terminals 11 are used by server 40 to identify the position of a reflective object by identifying a common reflective object from information on reflective objects that reflect waves. This will be described in greater detail later on. Delay profile creation unit 1131 creates a delay profile when radio wave reception unit 112 receives radio waves. For example, when radio wave reception unit 112 receives radio waves at predetermined intervals, delay profile creation unit 1131 may create the delay profile at each of the predetermined intervals. When radio wave reception unit 112 receives radio waves at a timing indicated by the determination result of determination unit 1135, delay profile creation unit 1131 may create the delay profile at a timing according to the determination result.

Next, the delay profile will be described.

Figure 5:
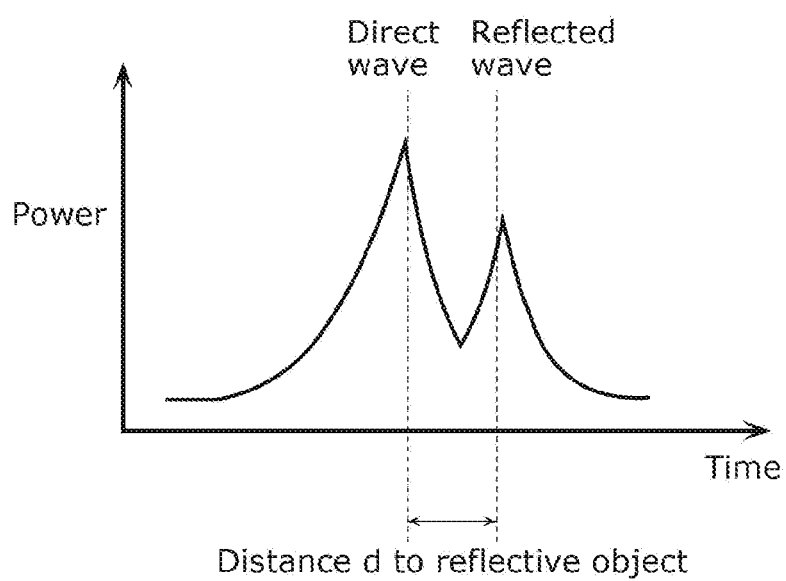
FIG. 5 is for describing the concept of the delay profile according to an embodiment of the present disclosure.

FIG. 5 is for describing the concept of the delay profile according to the present embodiment.

The delay profile indicates the delayed wave characteristics of the propagation path of radio waves, and indicates the relationship between the delay time and reception power as power information. If there is a reflective object in the propagation path of the radio waves, power indicated by the delay profile drastically increases due to the reflection of radio waves by the reflective object. FIG. 5 illustrates an example in which there is a single reflected wave received at a delayed time compared to a direct wave of the radio waves. Note that when a plurality of reflected waves are received, the delay profile indicates a plurality of the "mountains" indicated by the reflected wave illustrated in FIG. 5. As illustrated in FIG. 5, the time difference between the direct wave and the reflected wave is known from the delay profile, and thus distance d between reception terminal 11 and the reflective object is known from this time difference.

Figure 6:
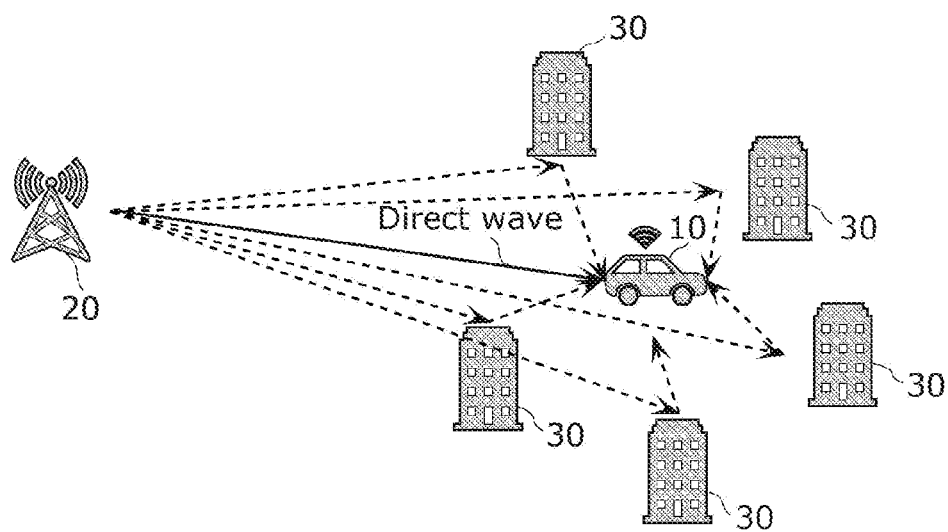
FIG. 6 is for illustrating multipath technology.
Figure 7:
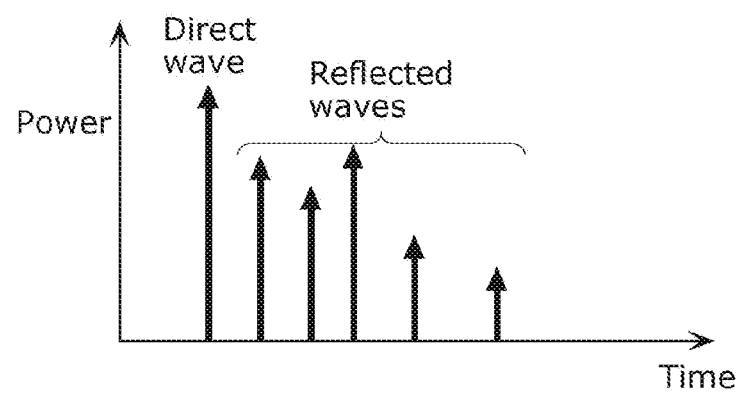
FIG. 7 conceptually illustrates one example of the delay profile predicated on the multipath example illustrated in FIG. 6.

FIG. 6 is for illustrating multipath technology. Elements that are the same as in FIG. 1 are labeled with the same reference signs, and detailed description thereof will be omitted. FIG. 7 conceptually illustrates one example of the delay profile predicated on the multipath example illustrated in FIG. 6.

In typical wave propagation, radio waves are reflected by landforms or structures and pass along a plurality of paths (multipath). FIG. 6 conceptually illustrates an example in which radio waves transmitted by transmission station 20 are reflected by six reflective objects 30 and propagate to mobile body 10 via multipath. The delay profile for this example indicates that a single direct wave and six reflected waves have been received, in terms of power and the time of the received radio waves, as illustrated in FIG. 7.

1.1.2.3.2 Upload Unit 1132

Upload unit 1132 transmits the delay profile created by delay profile creation unit 1131 to server 40 over a network. More specifically, upload unit 1132 controls communication unit 111 to transmit the delay profile created by delay profile creation unit 1131 to server 40 over a network.

Upload unit 1132 may transmit, along with the delay profile to server 40, information related to the position of reception terminal 11 at the time of reception of the radio waves and information related to the time at which radio wave reception unit 112 received the radio waves.

Upload unit 1132 may perform this transmission at predetermined intervals. Note that the predetermined interval may be every second, may be on the order of a few hours, and may be on the order of once every few days. Moreover, when performing this transmission, upload unit 1132 may reduce the predetermined interval if there is a fluctuation in the phase of a delayed wave relative to the direct wave included in the delay profile created by delay profile creation unit 1131, and may increase the predetermined interval once the fluctuation in the phase of the delayed wave subsides.

Upload unit 1132 may perform this transmission according to the determination result of determination unit 1135. For example, upload unit 1132 may perform this transmission according to a determination result indicating that the current position of reception terminal 11 is in the reception area. In such cases, upload unit 1132 need not perform this transmission when the current position of reception terminal 11 is not in the reception area.

1.1.2.3.3 Position Identification Unit 1133

Position identification unit 1133 uses GPS to identify the position that reception terminal 11 was at when the radio waves were received by radio wave reception unit 112. In the present embodiment, position identification unit 1133 uses GPS to identify the position that reception terminal 11 was at when radio wave reception unit 112 received a direct wave and a reflected wave of radio waves transmitted by transmission station 20. Moreover, position identification unit 1133 uses GPS to obtain the time of identification of the position of reception terminal 11, i.e., the time of reception by radio wave reception unit 112 of a direct wave and a reflected wave of the radio waves transmitted by transmission station 20.

1.1.2.3.4 Instruction Information Obtaining Unit 1134

Instruction information obtaining unit 1134 controls communication unit 111 to obtain instruction information from server 40. In the present embodiment, instruction information obtaining unit 1134 obtains, from server 40, instruction information including the reception area of the direct wave and the reflected wave to be received by reception terminal 11.

1.1.2.3.5 Determination Unit 1135

Determination unit 1135 determines whether the position of reception terminal 11 identified by position identification unit 1133 is within the reception area included in the instruction information obtained by instruction information obtaining unit 1134. As described above, when determination unit 1135 determines that the identified position of reception terminal 11 is within the reception area included in the instruction information, radio wave reception unit 112 is controlled to receive a direct wave and a reflected wave of the radio waves at the timing indicated in that determination result.

Determination unit 1135 may estimate a future position at which reception terminal 11 will be within a predetermined period of time based on the identified current position of reception terminal 11. In such cases, determination unit 1135 may further determine whether the estimated future position is within the reception area included in the instruction information or not. In this way, when determination unit 1135 determines that the future position is within in the reception area and the identified current position of reception terminal 11 is within the reception area, radio wave reception unit 112 is controlled to receive a direct wave and a reflected wave of the radio waves at the timing indicated in that determination result.

1.1.2.4 Memory 114

At least one of a program for implementing functions of communication unit 111, radio wave reception unit 112, and computation processing unit 113 or an application that utilizes the functional configurations of communication unit 111, radio wave reception unit 112, and computation processing unit 113 may be stored in advance in memory 114.

Memory 114 is also used to store, for example, data when the program or application described above is executed.

1.2 Transmission Station 20

Transmission station 20 has a fixed position and transmits radio waves of the same modulation scheme continuously or periodically. Transmission station 20 may transmit the same radio waves using orthogonal frequency division multiplexing (OFDM). For example, transmission station 20 may be a base station that transmits radio waves conforming to a Japanese digital terrestrial broadcasting scheme.

Figure 8A:
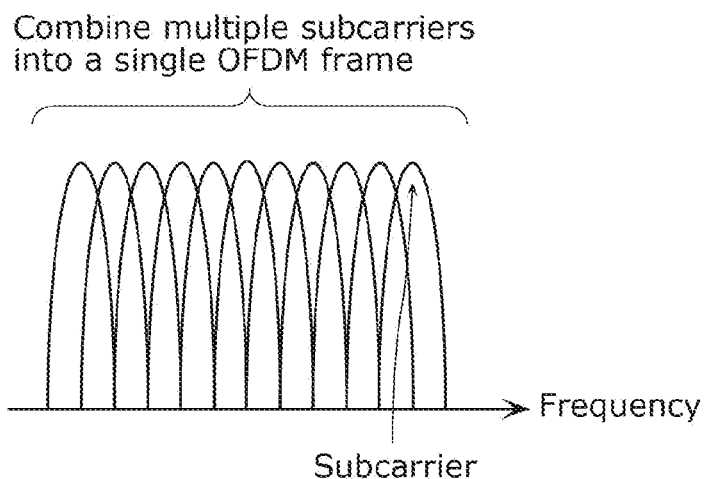
FIG. 8A conceptually illustrates OFDM subcarriers used in digital terrestrial broadcasting.
Figure 8B:
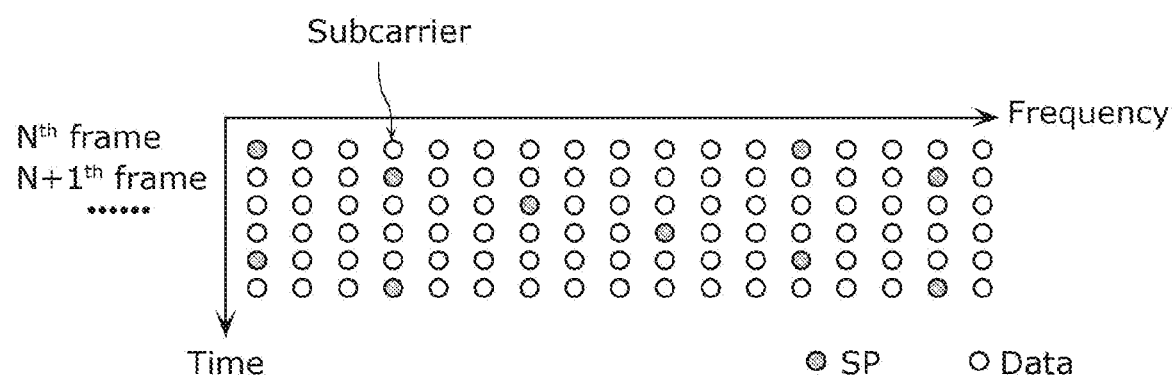
FIG. 8B conceptually illustrates SP signals inserted into digital terrestrial broadcasting radio waves.

FIG. 8A conceptually illustrates OFDM subcarriers used in digital terrestrial broadcasting. FIG. 8B conceptually illustrates SP signals inserted into digital terrestrial broadcasting radio waves. Next, a Japanese digital terrestrial broadcasting standard (ISDB-T) will be described.

OFDM is used in Japanese digital terrestrial broadcasting. With OFDM, there is little effect due to delay caused by multipath propagation paths. In OFDM, data is placed on a plurality of orthogonal subcarriers (carrier waves), and this data is transmitted as a single chunk of data. For example, one frame in OFDM is a combination of a plurality of subcarriers as illustrated in FIG. 8A. Moreover, as illustrated in FIG. 8A, even when adjacent subcarriers overlap one another, the data therein can be divided since the subcarriers are orthogonal to one another.

In general, all types of wireless communication insert a known pilot signal, not only digital terrestrial broadcasting. A pilot signal is a signal serving as a landmark that is transmitted and received in a signal. In digital terrestrial broadcasting, a scattered pilot (SP) signal is used as a pilot signal. As illustrated in FIG. 8B, for example, this SP signal is a known signal that is inserted at uniform intervals in the frequency and time directions, and is a signal that is known both transmission-side and reception-side.

Note that computation processing unit 113 (more specifically, delay profile creation unit 1131) described above can create the delay profile since computation processing unit 113 can measure distortion from a known state by referencing the amplitude and phase of the SP signal.

1.3 Reflective Object 30

Reflective object 30 reflects direct waves of radio waves transmitted by transmission station 20. Reflective object 30 is, for example, a structure such as a building, and has a fixed position. In FIG. 1, among a plurality of reflective objects 30, a single reflective object 30 that reflects a direct wave of the radio waves transmitted by transmission station 20, resulting in a reflected wave arriving at reception terminal 11 is illustrated.

1.4 Server 40

Server 40 is an aggregation server or a cloud server, and is implemented as a computer or the like including, for example, a processor (microprocessor), memory, and a communication interface.

Figure 9:
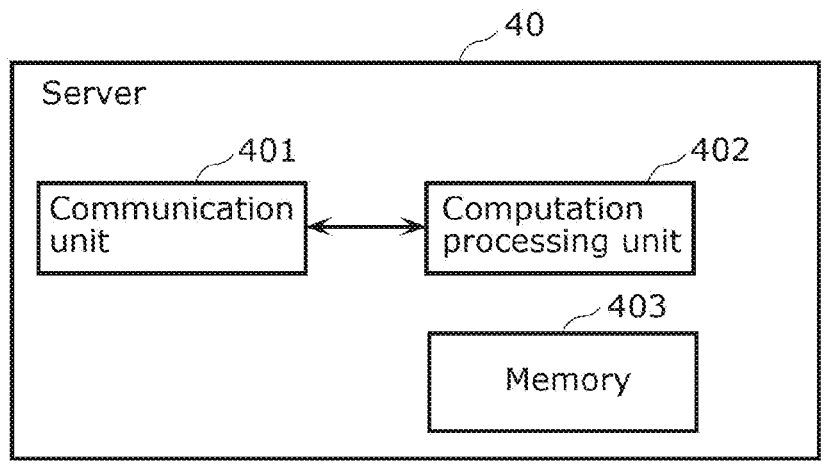
FIG. 9 is a block diagram illustrating one example of a configuration of a server according to an embodiment of the present disclosure.

FIG. 9 is a block diagram illustrating one example of a configuration of server 40 according to the present embodiment.

As illustrated in FIG. 9, in the present embodiment, server 40 includes communication unit 401, computation processing unit 402, and memory 403, can connect to reception terminal 11 over a network such as the internet, and can obtain information from at least one reception terminal 11.

1.4.1 Communication Unit 401

Communication unit 401 can communicate with each of a plurality of reception terminals 11 over a network.

In the present embodiment, communication unit 401 includes the reception area determined by computation processing unit 402 (to be described later) into instruction information and transmits the instruction information to reception terminal 11 over the network. For example, communication unit 111 obtains the delay profile from reception terminal 11. Here, communication unit 111 may obtain information related to position and information related to time along with the delay profile from reception terminal 11.

1.4.2 Computation Processing Unit 402

Figure 10:
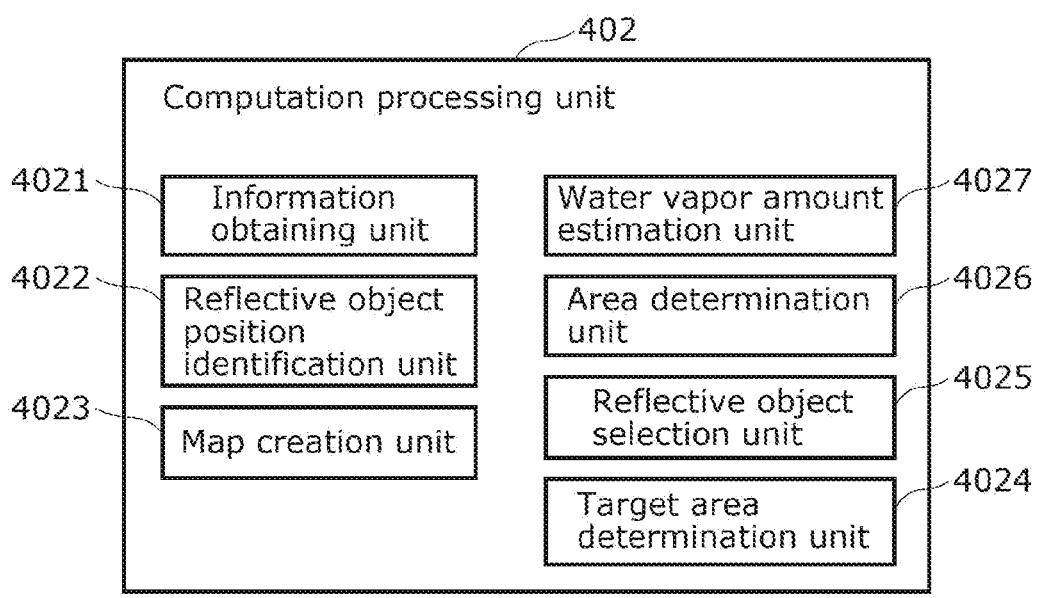
FIG. 10 is a block diagram illustrating one example of a functional configuration of the computation processing unit illustrated in FIG. 9.

FIG. 10 is a block diagram illustrating one example of a functional configuration of computation processing unit 402 illustrated in FIG. 9.

Computation processing unit 402 performs various processes using a CPU (not illustrated in FIG. 10) and memory 403. In the present embodiment, computation processing unit 402 includes information obtaining unit 4021, reflective object position identification unit 4022, map creation unit 4023, target area determination unit 4024, reflective object selection unit 4025, area determination unit 4026, and water vapor amount estimation unit 4027, as illustrated in FIG. 10.

1.4.2.1 Information Obtaining Unit 4021

Information obtaining unit 4021 obtains, from each of three or more reception terminals 11, a delay profile of the reception of a direct wave and a reflected wave by the reception terminal 11, indicating the time difference between the direct wave and the reflected wave. More specifically, information obtaining unit 4021 controls communication unit 401 to obtain the delay profiles from reception terminals 11 over the network.

Information obtaining unit 4021 may obtain, along with the delay profile, information related to the current position of reception terminal 11 at the time of reception of the direct wave and the reflected wave by reception terminal 11, as well as information related to the time at which reception terminal 11 was at that current position. The interval at which the delay profile is obtained may be every second, may be on the order of a few hours, and may be on the order of once every few days.

Information obtaining unit 4021 may obtain, from one or more reception terminals 11 within an area determined by area determination unit 4026 (to be described later), one or more delay profiles of the reception of the direct wave and the reflected wave by the one or more reception terminals 11.

1.4.2.2 Reflective Object Position Identification Unit 4022

Reflective object position identification unit 4022 identifies the position of reflective object 30 that reflected the reflected waves received by reception terminal 11, from a plurality of delay profiles obtained by information obtaining unit 4021.

Figure 11A:
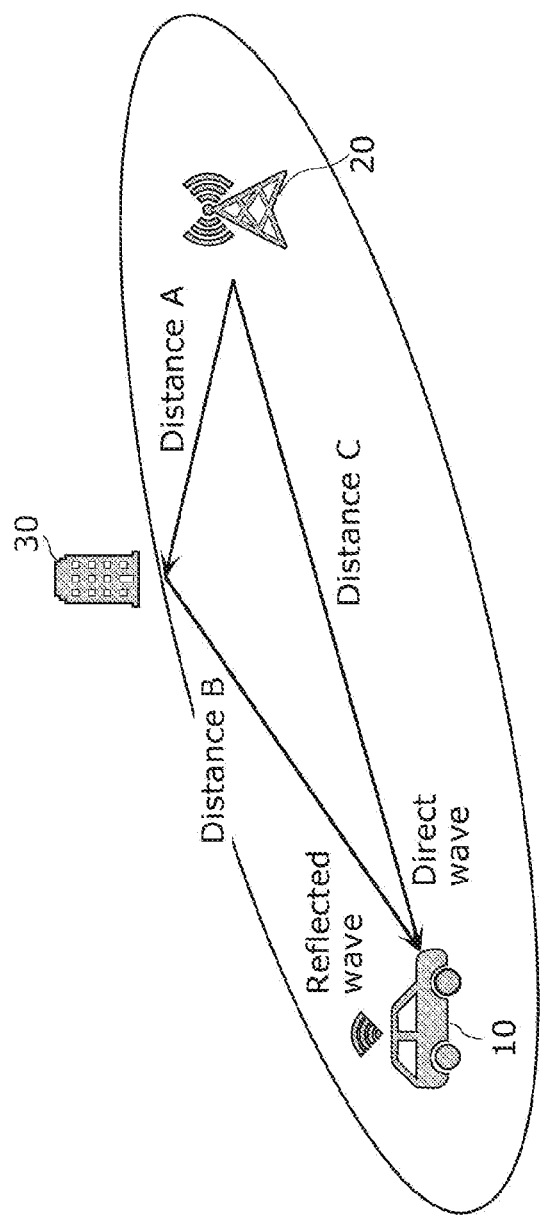
FIG. 11A is for describing a method of identifying the position of a reflective object from a plurality of delay profiles according to an embodiment of the present disclosure.
Figure 11B:
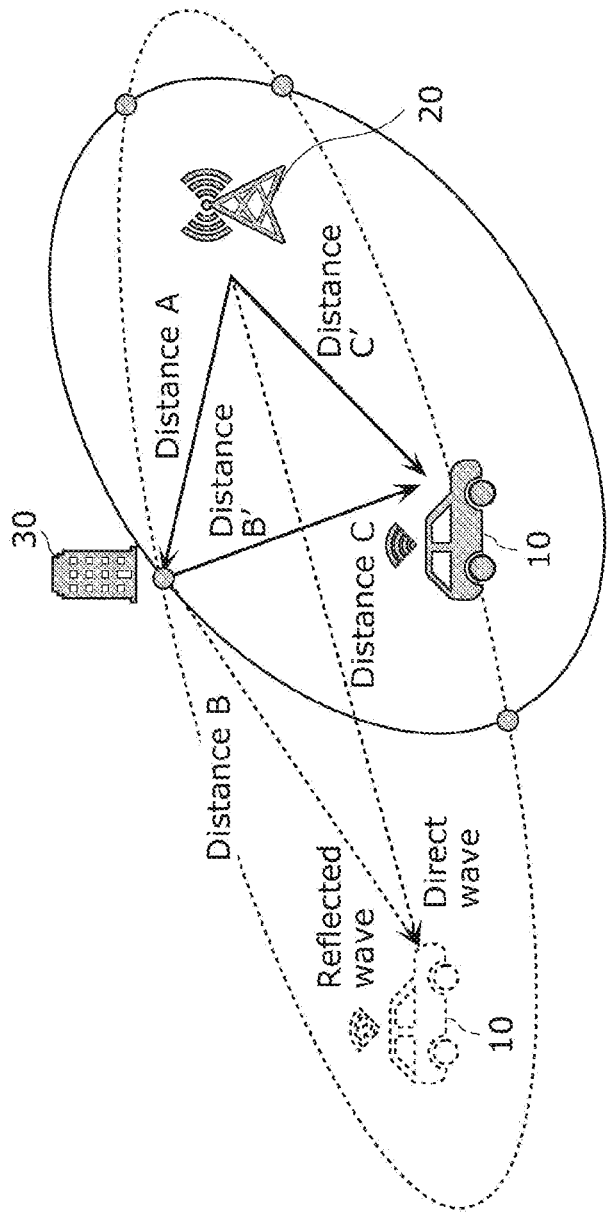
FIG. 11B is for describing a method of identifying the position of a reflective object from a plurality of delay profiles according to an embodiment of the present disclosure.

FIG. 11A and FIG. 11B are for describing a method of identifying the position of reflective object 30 from a plurality of delay profiles according to an embodiment of the present disclosure.

First, with reference to FIG. 11A, a location of reflective object 30 (on an ellipse whose focal points are the position of transmission station 20 and the position of reception terminal 11) that is obtained from a single delay profile will be described.

As illustrated in FIG. 11A, based on a difference between the time at which radio waves transmitted at the same time reach reception terminal 11 as a direct wave and as a reflected wave, which is obtained from the delay profile, distance difference D between the path distance of the reflected wave (distance A+distance B) and the path distance of the direct wave (distance C) can be calculated (because the speed at which radio waves travel is known). Here, distance difference D=(distance A+distance B−distance C).

Since the position of reception terminal 11 can be known from GPS information, distance C can be calculated from this position and the known position of transmission station 20 in a separate process. In other words, (distance A+distance B)=(distance difference D−distance C)=a constant value, so we know that reflective object 30 is present on an ellipse whose focal points are the positions of transmission station 20 and reception terminal 11.

Next, with reference to FIG. 11B, the location of reflective object 30 obtained from the time difference between a direct wave and a reflected wave from the delay profile in a case in which the position of transmission station 20 and the position of reflective object 30 are the same as in FIG. 11A but the position of reception terminal 11 is different will be described.

As illustrated in FIG. 11B, just like in FIG. 11A, an ellipse whose focal points are the positions of transmission station 20 and reception terminal 11 can be calculated.

Here, two ellipses having a common focal point either do not intersect or intersect at one to four points. FIG. 11B illustrates an example in which the ellipses intersect at four points. In other words, one of these points is the position of reflective object 30. This point is geometrically identifiable (i.e., the position of reflective object 30 is identifiable). If the two ellipses do not intersect, this indicates that the two reflective objects 30 corresponding to the two ellipses are different reflective objects 30.

As described above, by obtaining the delay profiles from reception terminals 11 in a plurality of positions with transmission station 20 in a fixed position, a plurality of ellipses on which reflective object 30 may be present are obtained, and intersections of these ellipses serve as candidate positions of reflective object 30.

Since there may be more than one positional relationship between transmission station 20 and reception terminal 11 and more than one reflective object 30, there is no guarantee that the position of a single reflective object 30 can be identified by collecting a number of delay profiles. However, by server 40 collecting delay profiles from many reception terminals 11 in different positions, the intersections of ellipses can be calculated. Therefore, it can be said that common intersections among many of the ellipses indicate, in effect, some reflective object 30.

Stated differently, reflective object position identification unit 4022 can identify the positions of mutually different reflective objects 30 by further using a plurality of delay profiles obtained by information obtaining unit 4021.

1.4.2.3 Map Creation Unit 4023

Map creation unit 4023 creates a map of positions of a plurality of reflective objects 30 per predetermined area. In the present embodiment, map creation unit 4023 uses the positions of mutually different reflective objects 30 identified by reflective object position identification unit 4022 to create a map of positions of the reflective objects 30 per predetermined area. For example, map creation unit 4023 may further obtain data related to land including the position of reception terminal 11 from land-use three-dimensional mesh data provided by the Ministry of Land, Infrastructure, Transport and Tourism. In such cases, map creation unit 4023 may use the positions of the mutually different reflective objects 30 identified by reflective object position identification unit 4022 and the obtained data related to the land to create a map for each predetermined area of the land.

FIG. 12 illustrates one example of a map of positions of a plurality of reflective objects 30 in a predetermined area according to the present embodiment.

In the example illustrated in FIG. 12, map creation unit 4023 has created a map of the positions of five reflective objects 30a through 30e in a predetermined area using the positions of the mutually different reflective objects 30 identified by reflective object position identification unit 4022. Note that map creation unit 4023 may create a map including transmission station 20 in the predetermined area in addition to the positions of the plurality of reflective objects 30 (the five reflective objects 30a through 30e), like illustrated in FIG. 12.

1.4.2.4 Target Area Determination Unit 4024

Target area determination unit 4024 determines a target area to estimate an amount of water vapor in. For example, target area determination unit 4024 determines a target area to estimate an amount of water vapor in using the maps created per predetermined area of land by map creation unit 4023.

FIG. 13 schematically illustrates the process for estimating an amount of water vapor according to present embodiment. In other words, target area determination unit 4024 may determine target area 70 to estimate an amount of water vapor in, like that illustrated in FIG. 13, using, for example, the map illustrated in FIG. 9 that is created by map creation unit 4023.

1.4.2.5 Reflective Object Selection Unit 4025

Reflective object selection unit 4025 selects a single reflective object 30 in the predetermined area including the target area determined by target area determination unit 4024, using the map created by map creation unit 4023.

In the present embodiment, reflective object selection unit 4025 uses, for example, the map illustrated in FIG. 12 that is created by map creation unit 4023 to select a single reflective object 30 among the plurality of reflective objects 30 in the predetermined area. In the example illustrated in FIG. 13, reflective object selection unit 4025 selects, from among the five reflective objects 30a through 30e, reflective object 30b which appears to be capable of reflecting the radio waves transmitted by transmission station 20 from the viewpoint of target area 70.

1.4.2.6 Area Determination Unit 4026

Area determination unit 4026 determines, as the reception area, an area extending along a line connecting the position of the single reflective object selected by reflective object selection unit 4025 and the target area determined by target area determination unit 4024. Area determination unit 4026 controls communication unit 401 to transmit the determined reception area (by including it in the instruction information) to a plurality of reception terminals 11 over a network.

In the example illustrated in FIG. 13, area determination unit 4026 determines reception area 81 extending along the line connecting reflective object 30b selected by reflective object selection unit 4025 and target area 70. Note that in the example illustrated in FIG. 13, area determination unit 4026 determines a range within a predetermined distance from straight line 80 passing through reflective object 30b and the center of target area 70 to be reception area 81. This reception area 81 corresponds to the reception area of the direct wave and the reflected wave to be received by reception terminal 11.

1.4.2.7 Water Vapor Amount Estimation Unit 4027

Water vapor amount estimation unit 4027 estimates the amount of water vapor in the target area using the delay profile obtained by information obtaining unit 4021.

Figure 14:
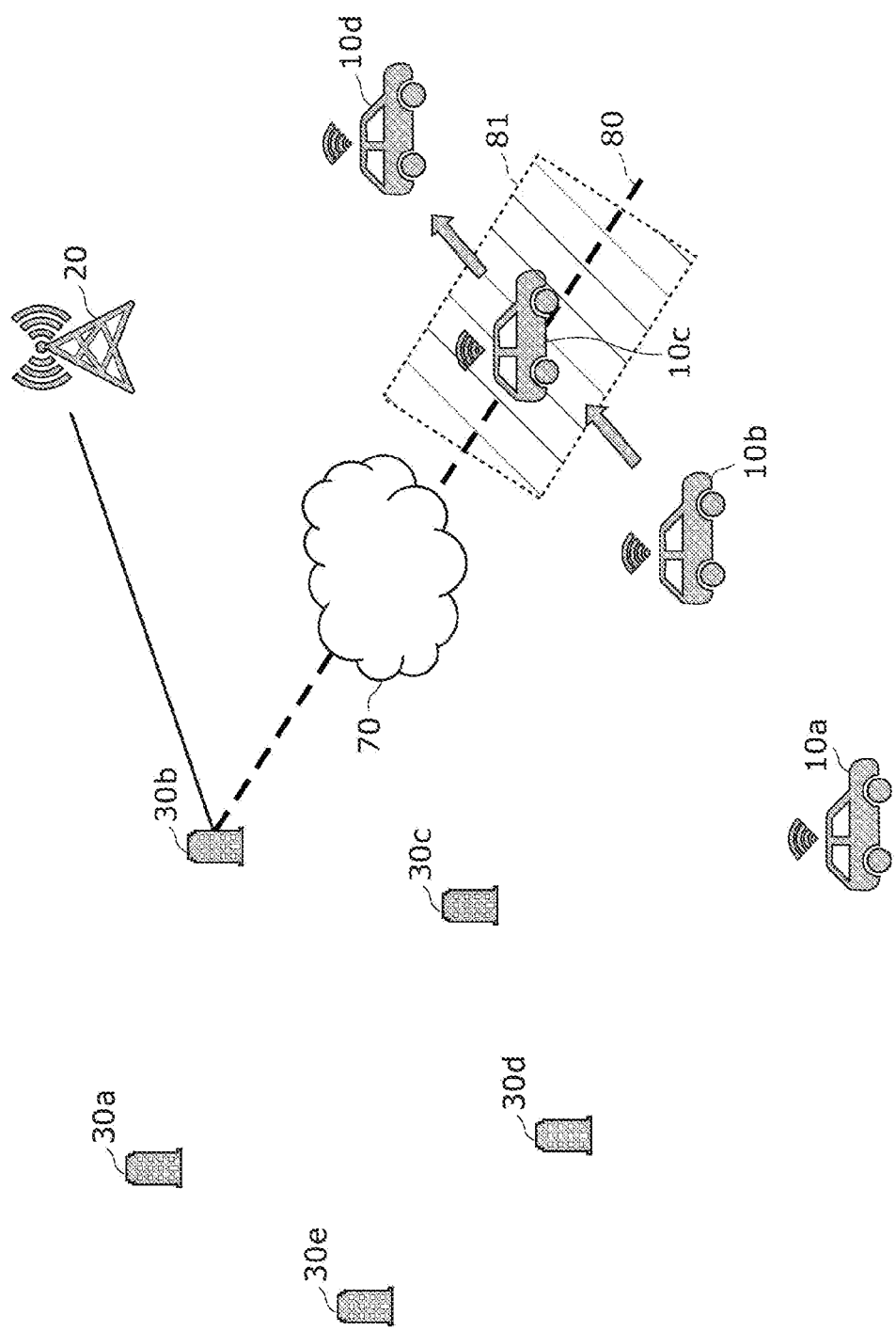
FIG. 14 schematically illustrates a process for obtaining a delay profile for estimating an amount of water vapor according to an embodiment of the present disclosure.

FIG. 14 schematically illustrates the process for obtaining the delay profile for estimating an amount of water vapor according to present embodiment. Elements that are the same as in FIG. 13 are labeled with the same reference signs, and detailed description thereof will be omitted.

In the present embodiment, for example as illustrated in FIG. 14, water vapor amount estimation unit 4027 estimates the amount of water vapor in target area 70 using one or more delay profiles obtained from one or more reception terminals 11 (mobile bodies 10) within reception area 81 determined by area determination unit 4026. The example illustrated in FIG. 14 shows a case in which the plurality of mobile bodies 10a through 10d are moving, and the delay profile obtained from mobile body 10c (reception terminal 11), which is the only mobile body (reception terminal) within reception area 81 determined by area determination unit 4026, is used for estimating the amount of water vapor in target area 70.

Note that the plurality of reception terminals 11 (mobile bodies 10) may continuously transmit the delay profile and the like to server 40. In such cases, water vapor amount estimation unit 4027 may extract and use one or more delay profiles obtained from one or more reception terminals 11 included in the area determined by area determination unit 4026, from among the plurality of obtained delay profiles.

Water vapor amount estimation unit 4027 then calculates the phase of the delayed wave relative to the direct wave (main wave), from the power information obtained from the delay profile. Water vapor amount estimation unit 4027 can calculate fluctuations in the delay amount in a space (the target area) that the radio waves passed through, from fluctuations in the phase of the calculated delayed wave. The fluctuations in the delay amount are regarded as fluctuations in the amount of water vapor in the space (the target area). Accordingly, water vapor amount estimation unit 4027 can estimate the amount of water vapor in the space (the target area) from a plurality of delay profiles obtained from the one or more reception terminals 11 that received the delayed wave.

Next, the principles and the like for estimating an amount of water vapor will be described.

Figure 15A:
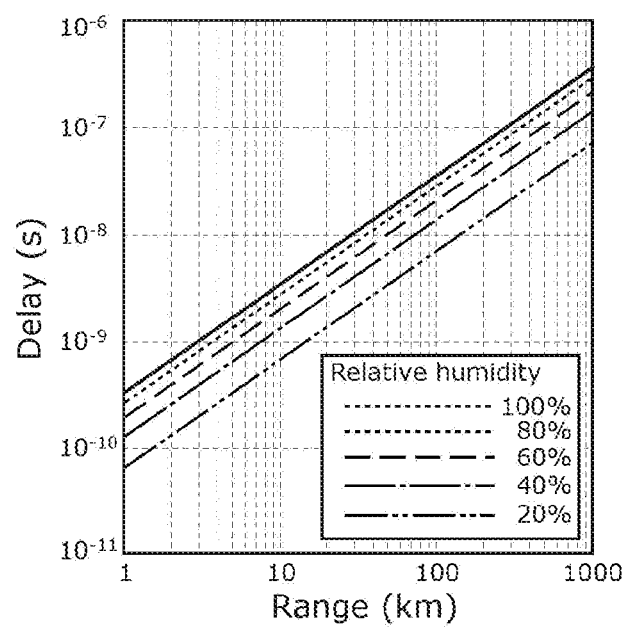
FIG. 15A illustrates changes in radio wave propagation delay relative to the relative humidity under the condition of one atmosphere and 20 degrees Celsius.

FIG. 15A illustrates changes in radio wave propagation delay relative to the relative humidity under the condition of one atmosphere and 20 degrees Celsius. As illustrated in FIG. 15A, the speed at which a radio wave travels fluctuates according to the amount of water vapor in the atmosphere. In other words, although radio waves propagate at the speed of light in a vacuum, the propagation speed fluctuates in the atmosphere due according to the amount of water vapor. For example, when radio waves propagate at a distance of 5 km, a 1% increase in the relative humidity cause a propagation delay of approximately 17 ps (approximately 5 mm in length). Accordingly, it is possible to measure the amount of water vapor in the atmosphere by measuring the propagation speed of radio waves.

Figure 15B:
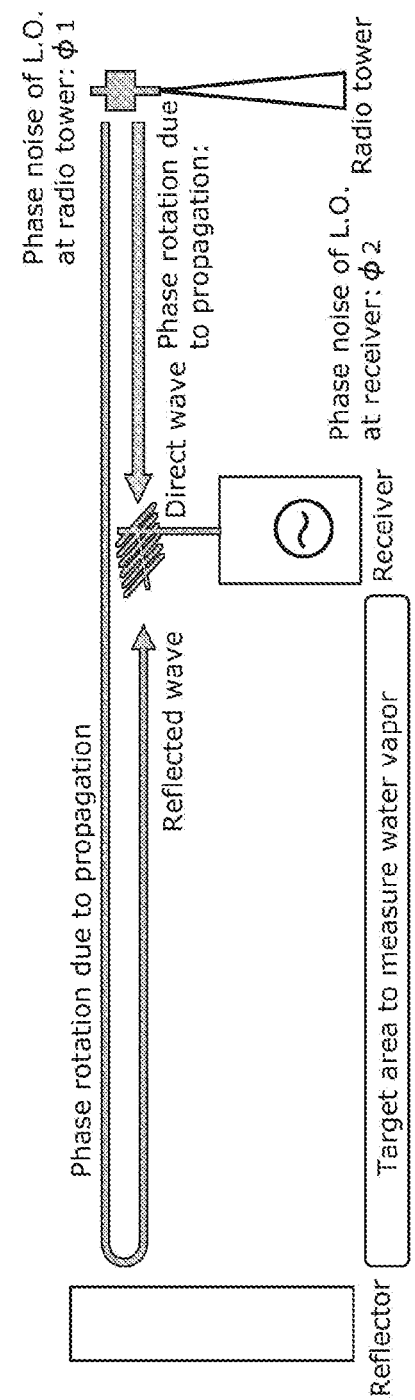
FIG. 15B illustrates a configuration for measuring radio wave propagation delay according to a comparative example.

FIG. 15B illustrates a configuration for measuring radio wave propagation delay according to a comparative example. FIG. 15B illustrates a configuration of a method (referred to as reflection method) of measuring an amount of water vapor using two radio waves, namely a radio wave received at the point of reception directly from the transmission station (i.e., a direct wave) and a radio wave transmitted from the transmission station and received at the point of reception after reflecting off a reflective object (i.e., a reflected wave).

The delay time of the delayed wave relative to the direct wave can be calculated from the difference in phases of the radio waves in the delay profiles. The phase $\theta$ in a typical wave motion can be expressed in terms of frequency f and time t, as illustrated in Equation 1 below. Since the delay time is known from the phase difference, it is possible to calculate the amount of water vapor by converting this into propagation speed.

$$\theta = 2\pi ft \qquad \text{Equation 1:}$$

The transmission station labeled as a radio tower in FIG. 15B transmits a signal of a reference frequency known as a carrier wave superimposed with data as radio waves. The oscillation in the oscillator for generating this reference frequency is technically not constant, resulting in phase noise ($\Phi_1$).

The reception point labeled as receiver receives radio waves including the signal of the reference frequency known as a carrier wave superimposed with data. Accordingly, since a signal of the reference frequency is generated at the reception point as well and the data is extracted from the transmitted radio waves, there is phase noise ($\Phi_2$) in the oscillator.

In other words, with the reflection method, aside from the component corresponding to the change in the amount of water vapor, the phase change in the direct wave and the reflected wave (delayed wave) illustrated in FIG. 15B is also affected by the phase noises ($\Phi_1+\Phi_2$) of the oscillators, but the phase noises ($\Phi_1+\Phi_2$) between the two are exactly the same. Accordingly, the effect of the phase noises ($\Phi_1+\Phi_2$) can be cancelled out by taking the difference between the reflected wave and the direct wave to obtain the phase difference between the reflected wave and the direct wave.

In this way, using the reflection method, a roundtrip propagation delay between the reception point and the reflective object can be accurately calculated, whereby the amount of water vapor in the target area between the reception point and the reflective object can be accurately estimated.

1.4.3 Memory 403

At least one of a program for implementing functions of communication unit 401 and computation processing unit 402 or an application that utilizes the functional configurations of communication unit 401 and computation processing unit 402 may be stored in advance in memory 403.

Memory 403 is also used to store, for example, data when the program or application described above is executed.

2. Operation of Overall System

Next, the operation of the overall system configured as described above will be described.

2.1 Operation of Reception Terminal 11 According to Embodiment.

First, the operation of the reception terminal 11 configured as described above will be described.

Figure 16:
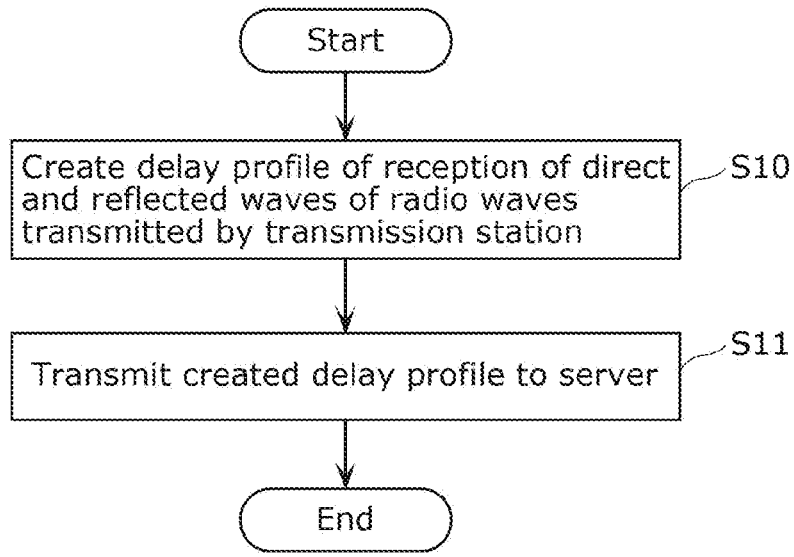
FIG. 16 is flowchart illustrating an example of an operation of a reception terminal according to an embodiment of the present disclosure.

FIG. 16 is flowchart illustrating an example of an operation of reception terminal 11 according to the present embodiment.

First, reception terminal 11 creates a delay profile of the reception of a direct wave and a reflected wave from transmission station 20 (S10). More specifically, when reception terminal 11 provided in or on mobile body 10 receives a direct wave and a reflected wave of radio waves transmitted by transmission station 20, reception terminal 11 creates a delay profile of the reception of the direct wave and the reflected wave, indicating the time difference between the direct wave and the reflected wave. Note that using this delay profile, it is possible to calculate the distance between reception terminal 11 and a reflective object that reflected the reflected wave from the time difference. Moreover, as described above, this delay profile can also be used to estimate an amount of water vapor in a space through which the reflected wave passed (i.e., the target area).

Next, reception terminal 11 transmits the delay profile created in step S10 to server 40 over a network (S11). More specifically, reception terminal 11 transmits, to server 40 along with the delay profile, information related to the position of reception terminal 11 at the time of reception of the radio waves and information related to the time at which radio wave reception unit 112 received the radio waves. Note that the position and time are obtained using GPS.

2.2 Operation of Server 40

Next, the operation of the server 40 configured as described above will be described.

Figure 17:
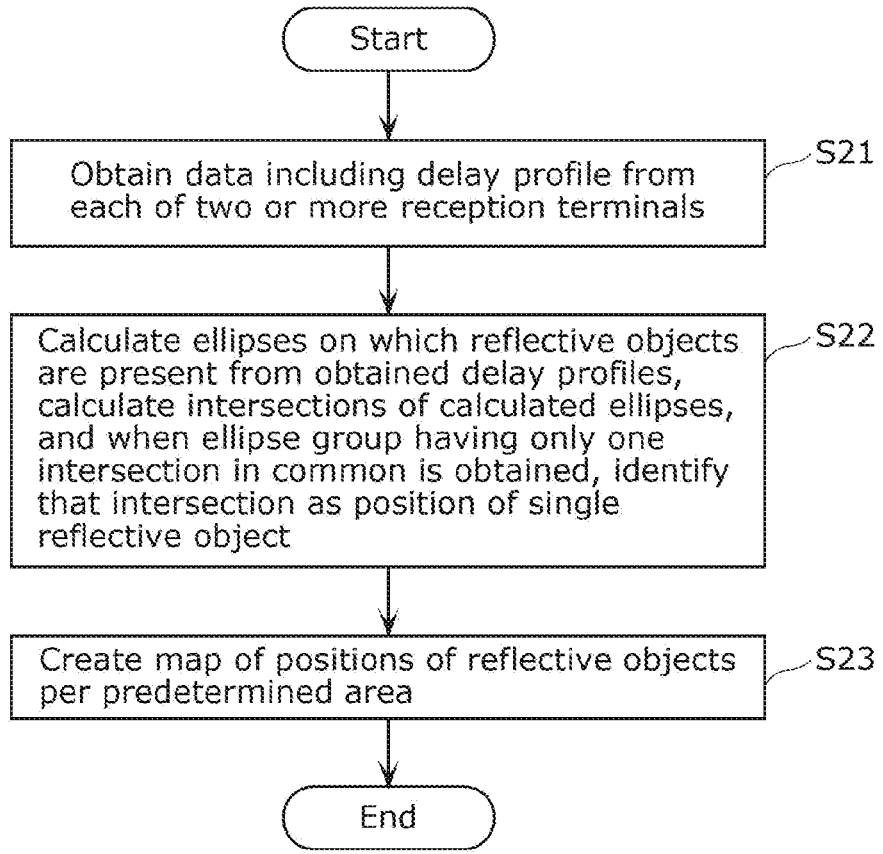
FIG. 17 is flowchart illustrating an example of an operation of a server according to an embodiment of the present disclosure.

FIG. 17 is flowchart illustrating an example of an operation of server 40 according to the present embodiment. FIG. 17 illustrates an example of an operation performed by server 40 for identifying the position of reflective object 30 using delay profiles obtained from reception terminals 11 and creating a map using the identified position of reflective object 30.

First, server 40 obtains data including delay profiles from two or more reception terminals (S21). More specifically, along with the delay profile, server 40 obtains, from each of two or more reception terminals 11, information related to the current position of the reception terminal 11 at the time of reception of the direct wave and the reflected wave by the reception terminal 11, as well as information related to the time at which the reception terminal 11 was at that current position. Hereinafter, for the sake of explanation, a maximum of one reflected wave per delay profile transmitted from server 40 from each reception terminal 11 will be considered (influence by a plurality of reflected waves are typically recorded in a delay profile).

Next, server 40 calculates ellipses on which respective reflective objects 30 that reflected radio waves transmitted by transmission station 20 are present from two or more delay profiles obtained in step S21, and further geometrically calculates a group of intersections of the calculated ellipses. Note that the group of intersections includes intersections that indicate the position of reflective object 30 and intersections that do not. When the plurality of ellipses have only one intersection in common, that intersection is identified as the position of reflective object 30 (S22). Here, when the obtained delay profiles indicate only one reflective object 30, there is only one common intersection among all of the ellipses. When there are two reflective objects 30, there are two ellipse groups. Each ellipse group has only one intersection in common. This process will be described in greater detail later with reference to FIG. 18.

Next, server 40 creates a map of positions of a plurality of reflective objects 30 per predetermined area (S23). More specifically, server 40 creates a map of positions of a plurality of reflective objects 30 per predetermined area using the positions of the plurality of mutually different reflective objects 30 identified in step S22.

Figure 18:
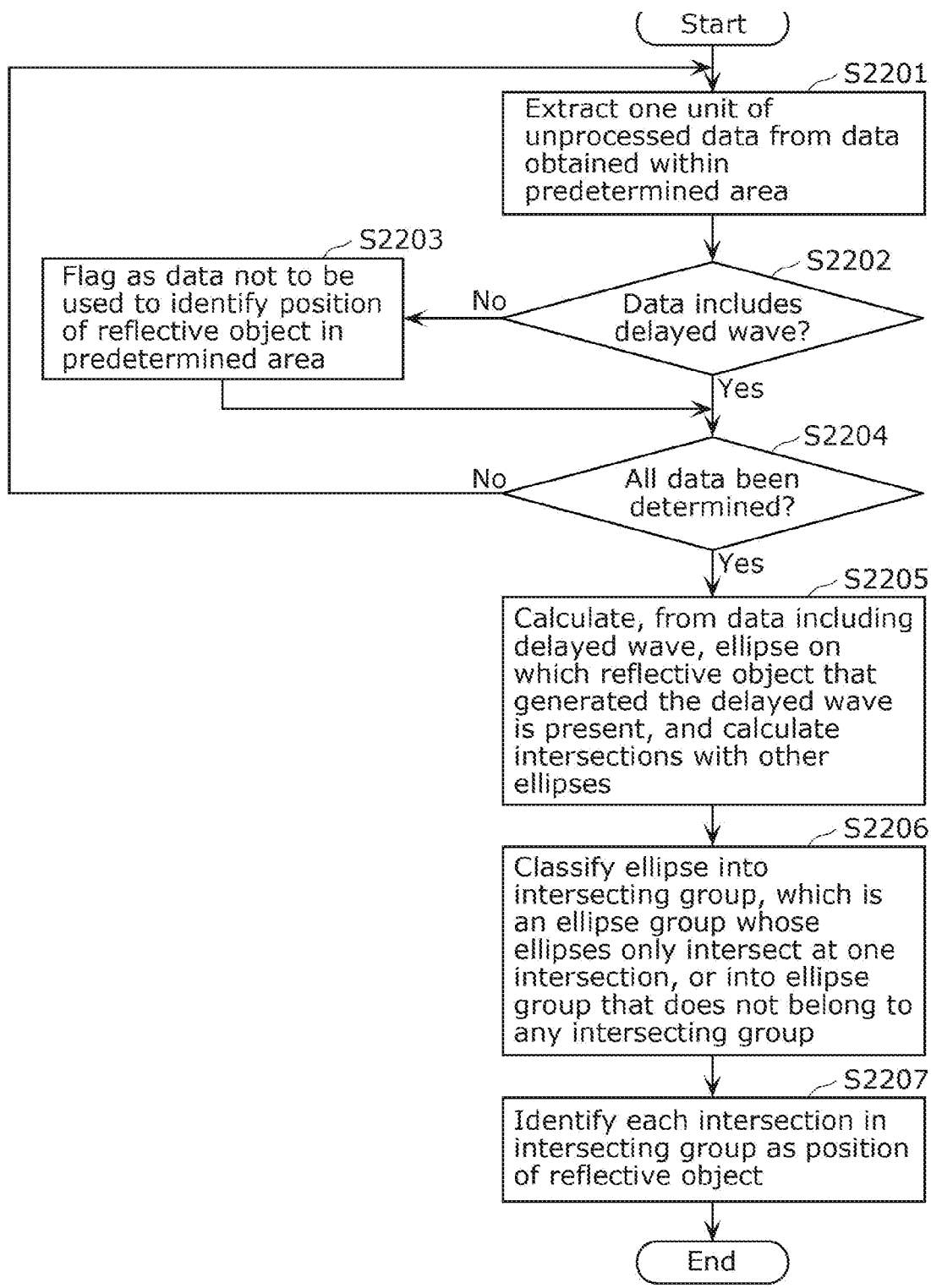
FIG. 18 is a flowchart illustrating the process of step S22 in FIG. 17 in greater detail.

FIG. 18 is a flowchart illustrating the process of step S22 in FIG. 17 in greater detail. FIG. 18 illustrates one example of a method of identifying positions of reflective objects 30 according to the present embodiment.

First, server 40 extracts data obtained within a predetermined area, one by one (S2201). More specifically, in order to identify positions of reflective objects 30 within a predetermined area, server 40 obtains, one by one, data including delay profiles obtained within the predetermined area.

Next, server 40 determines whether the data extracted in step S2021 includes a delayed wave (S2202). Note that server 40 can determine whether that data includes a delayed wave by determining whether a delay profile included in each of the data includes a direct wave and a reflected wave (delayed wave).

When server 40 determines that the data does not include a delayed wave in step S2202 (NO in S2202), server 40 flags the data as data that is not to be used in the identifying of the position of a reflective object in the predetermined area (S2203). Thereafter, or when the result of step S2202 is YES, server 40 determines whether the determining of whether the delay profiles include a delayed wave or not has been performed for all of the data (S2204), and if there is data that has not been determined yet (NO in S2204), server 40 returns to step S2201 and performs the process again.

Steps after S2204 are performed only on data including delay profiles including delayed waves.

In step S2205, the following processes labeled (1) through (4) are performed on each item of data (each delay profile).

(1) The time difference between the direct wave and the delayed wave is calculated, and the difference (distance) between the path (distance) that the delayed wave traveled and the path (distance) that the direct wave traveled is calculated from the product of the time difference and the propagation speed of radio waves. (2) The position of reception terminal 11 is calculated from the data (the position can be known from GPS data, for example), and the path (distance) that the direct wave traveled is calculated from the known position of transmission station 20. (3) Taking the above results into consideration, the path (distance) that the delayed wave traveled, i.e., (the distance from transmission station 20 to reflective object 30)+(the distance from reflective object 30 to reception terminal 11) is calculated.

Here, although the position of reflective object 30 cannot be identified, it is known that the sum of the distance from reflective object 30 to transmission station 20 and the distance from reflective object 30 to reception terminal 11 is a given value (a constant value). This indicates that reflective object 30 is present on an ellipse whose focal points are the position of transmission station 20 and reception terminal 11.

(4) (A coordinate system is established and) an equation for the ellipse is geometrically derived.

After the above processes, intersections of the ellipses are geometrically calculated. The intersections include those that indicate a position of reflective object 30 and those that do not.

Next, in step S2206, the following determining process is performed for each intersection.

Whether all ellipses in the ellipse group including the intersection intersect at that intersection only is determined.

Lastly, in step S2207, among ellipse groups of ellipses that share just one intersection, those intersections are identified as positions of reflective objects 30.

By performing a method of identifying positions of reflective objects 30 in this way, a plurality of reflective objects included in a predetermined area can be identified. This enables the execution of step S23 described above and illustrated in FIG. 17.

2.3 Example of Operation Performed when Estimating Amount of Water Vapor

Next, an example of an operation performed when estimating an amount of water vapor in the overall system will be given.

Figure 19:
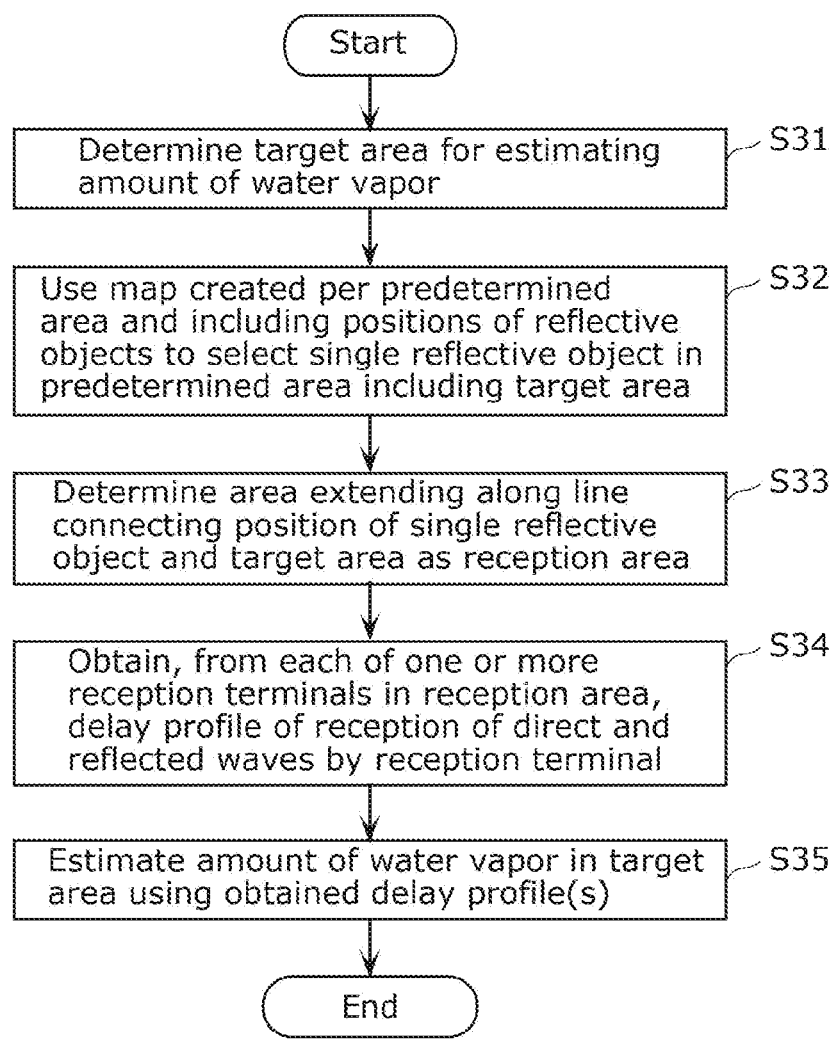
FIG. 19 is flowchart illustrating an example of an operation of estimating an amount of water vapor by a server according to an embodiment of the present disclosure.

FIG. 19 is flowchart illustrating an example of an operation of estimating an amount of water vapor by server 40 according to the present embodiment. FIG. 19 illustrates an example of an operation of determining a reception area using a map including positions of reflective objects 30 created by server 40, and estimating an amount of water vapor using one or more delay profiles obtained from reception terminal 11 positioned in the reception area. Hereinafter, the operation will be described using the examples illustrated in FIG. 13 and FIG. 14 as specific examples.

First, as illustrated in FIG. 19, server 40 determines a target area for estimating an amount of water vapor (S31). In the example illustrated in FIG. 13, server 40 determines target area 70 as the target area for estimating an amount of water vapor.

Next, server 40 uses a map, which is created per predetermined area and includes the positions of a plurality of reflective objects 30, to select a single reflective object 30 in the predetermined area including the target area (S32). In the example illustrated in FIG. 13, server 40 uses the map illustrated in FIG. 12 to select, from among the five reflective objects 30a through 30e, reflective object 30b which appears to be capable of reflecting the radio waves transmitted by transmission station 20 from the viewpoint of target area 70.

Next, server 40 determines, as the reception area, an area extending along a line connecting the position of the single reflective object selected in step S32 and the target area determined in step S31 (S33). In the example illustrated in FIG. 13, server 40 determines a range within a predetermined distance from straight line 80 passing through reflective object 30b and the center of target area 70 to be reception area 81.

Next, server 40 obtains, from one or more reception terminals 11 positioned in the reception area determined in step S33, one or more delay profiles of the reception of the direct wave and the reflected wave by the one or more reception terminals 11 (S34). In the example illustrated in FIG. 14, server 40 obtains one or more delay profiles from one or more reception terminals 11 (mobile bodies 10) within reception area 81. More specifically, along with the delay profile, server 40 obtains, from each of one or more reception terminals 11 within reception area 81, information related to the current position of the reception terminal 11 at the time of reception of the direct wave and the reflected wave by reception terminal 11, as well as information related to the time at which reception terminal 11 was at that current position.

In the example illustrated in FIG. 14, only those reception terminals 11 that are in reception area 81 transmit the delay profile and the like to server 40. Here, server 40 can transmit the instruction information including the determined reception area 81 to a plurality of reception terminals 11 to cause only those reception terminals 11 that are in reception area 81 to transmit the delay profile and the like to server 40. This enables server 40 to obtain the delay profiles and the like from a plurality of reception terminals 11 that are in reception area 81. Each of the plurality of reception terminals 11 may continuously transmit the delay profile and the like to server 40. In such cases, server 40 may extract, from among the plurality of obtained delay profiles, one or more delay profiles and the like obtained from the one or more reception terminals 11 that are within reception area 81 determined in step S33.

Next, server 40 uses the one or more delay profiles obtained in step S34 to estimate the amount of water vapor in the target area determined in step S31 (S35). In the example illustrated in FIG. 14, server 40 uses the one or more delay profiles obtained from the one or more reception terminals 11 within reception area 81 to estimate the amount of water vapor in target area 70.

Figure 20:
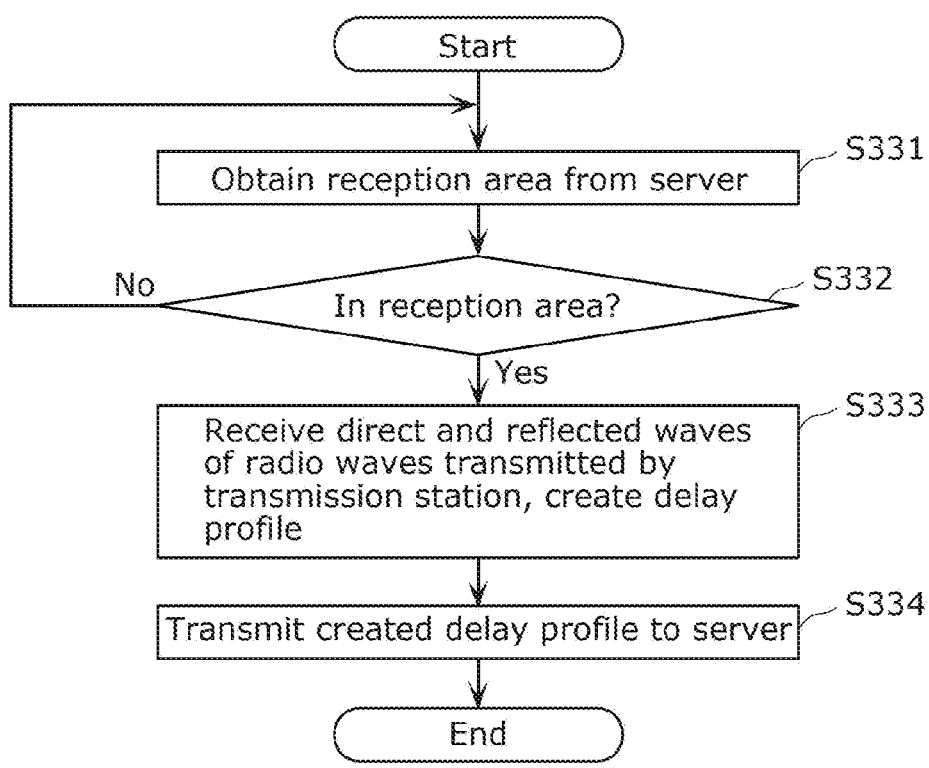
FIG. 20 is flowchart illustrating an example of an operation performed by a reception terminal when estimating an amount of water vapor according to an embodiment of the present disclosure.

FIG. 20 is flowchart illustrating an example of an operation performed by reception terminal 11 when estimating an amount of water vapor according to the present embodiment. FIG. 20 illustrates an example of an operation performed when transmitting a delay profile and the like to server 40 when reception terminal 11 is positioned within the reception area determined by server 40.

First, reception terminal 11 obtains the reception area from server 40 (S331). More specifically, reception terminal 11 obtains instruction information including the reception area determined by server 40 from server 40.

Next, reception terminal 11 determines whether it is within the reception area obtained in step S331 (S332). More specifically, reception terminal 11 can use GPS to detect its own position (the position of reception terminal 11), and determines whether its own position is within the reception area.

When, in step S332, reception terminal 11 determines that it is located within the reception area (YES in S332), reception terminal 11 creates a delay profile of the reception of the direct wave and the reflected wave from transmission station 20 (S333). More specifically, when its position is within the reception area, reception terminal 11 transmits, to server 40 along with the delay profile, information related to the position of reception terminal 11 at the time of reception of the radio waves transmitted by transmission station 20 and information related to the time at which radio wave reception unit 112 received the radio waves transmitted by transmission station 20. When, in step S332, reception terminal 11 determines that it is not located within the reception area (NO in S332), the processing returns to step S331.

Next, reception terminal 11 transmits the delay profile and the like created in step S333 to server 40 over a network (S334). As the process in step S334 is the same as the process in step S11, repeated description is omitted.

3. Advantageous Effects, Etc.

As described above, mobile reception terminal 11 according to the present embodiment transmits, to server 40, a delay profile of the reception of a direct wave and a reflected wave of radio waves transmitted by transmission station 20, one example of which is a broadcast station, whose location is fixed and that transmits radio waves of the same modulation scheme periodically. This makes it possible to identify the position of a reflective object by using the delay profile transmitted by reception terminal 11, even if reception terminal 11 is mobile. Stated differently, this makes it possible to achieve an information transmission method and a mobile reception terminal capable of transmitting information that can identify the position of a reflective object that reflected a radio wave transmitted from transmission station 20 such as a broadcast station.

Furthermore, server 40 according to the present embodiment can identify the position of reflective object 30 that reflected a radio wave transmitted by transmission station 20 such as a broadcast station, even when a mobile reception terminal 11 provided in or on mobile body 10 is used. Server 40 according to the present embodiment can estimate an amount of water vapor by using the delay profile obtained from reception terminal 11, utilizing the identified position of reflective object 30. Stated differently, it is possible to achieve an information processing method that can identify the position of a reflective object that reflected a radio wave transmitted from a transmission station such as a broadcast station and estimate an amount of water vapor, even when a mobile reception terminal is used.

POSSIBILITY OF OTHER EMBODIMENTS

Although the information transmission method, the information processing method, and the mobile reception terminal according to the present disclosure have been described by way of an exemplary embodiment, the elements or devices that execute the processes are not particularly limited. A processor or the like in a specific, local device may execute the processes in the information processing method (this will be described below). Moreover, a cloud server in a different location than the local device may execute the processes in the information processing method.

Note that the present disclosure is not limited to the above embodiment. For example, embodiments resulting from arbitrary combinations of elements described in the present specification or embodiments in which some of the elements are left out may also be embodiments of the present disclosure. Moreover, so long as they are within the spirit of the present disclosure, that is to say, so long as they do not depart from the scope of the appended claims, variations conceived by those skilled in the art resulting from modifying the above embodiment are included within the present disclosure.

The present disclosure may also include the following.

(1) The devices described above may be implemented as a computer system that includes, for example, a microprocessor, ROM, RAM, a hard disk unit, a display unit, a keyboard, and a mouse. The RAM or the hard disk unit stores a computer program. The functions of the devices are realized by the microprocessor operating in accordance with the computer program. Here, the computer program is a collection of command codes that indicate instructions to the computer for realizing a predetermined function.

(2) One or more of the elements included in the devices described above may be implemented as a single system large scale integration (LSI) circuit. A system LSI circuit is a super-multifunctional LSI circuit manufactured by integrating a plurality of elements on a single chip. More specifically, the system LSI circuit is a computer system that includes, for example, a microprocessor, ROM, and RAM. The RAM stores a computer program. The functions of the system LSI circuit are realized by the microprocessor operating in accordance with the computer program.

(3) One or more of the elements included in the devices described above may be implemented as an integrated circuit (IC) card or a single module that is removable from each device. The IC card or the module is a computer system that includes, for example, a microprocessor, ROM, and RAM. The IC card or the module may include the super-multifunctional LSI circuit described above. The functions of the IC card or the module are realized by the microprocessor operating in accordance with the computer program. Such IC card or module may be tamper resistant.

(4) The present disclosure may also be a computer system that includes a microprocessor and memory. The memory may store the computer program and the microprocessor may operate in accordance with the computer program.

INDUSTRIAL APPLICABILITY

The present disclosure can be applied as an information transmission method and a mobile reception terminal that transmit a delay profile that is used for estimating an amount of water vapor in a desired target area and can identify the position of a reflective object, as well as an information processing method that can identify the position of a reflective object using an obtained delay profile and estimate an amount of water vapor in a desired target area.

The invention claimed is:

1. An information transmission method performed by a mobile reception terminal that is connected to a server over a network, the information transmission method comprising:
   receiving a direct wave and a reflected wave of radio waves transmitted by a transmission station that has a fixed position and transmits radio waves of a same modulation scheme continuously or periodically;
   creating a delay profile of reception of the direct wave and the reflected wave, the delay profile indicating a time difference between the direct wave and the reflected wave;
   identifying a position of the mobile reception terminal, the position corresponding to the reception of the direct wave and the reflected wave; and
   transmitting the delay profile to the server over the network,
   wherein the transmitting includes transmitting, to the server along with the delay profile, information related to the position identified in the identifying, and
   the delay profile is used by the server to calculate a distance between the mobile reception terminal and a reflective object that reflected the reflected wave based on the time difference.

2. The information transmission method to claim 1, wherein the information transmission method executes the transmitting the delay profile at predetermined intervals.

3. The information transmission method according to claim 1,
   wherein the transmitting includes transmitting, to the server along with the delay profile and the information related to the position identified in the identifying, information related to reception times of the direct wave and the reflected wave.

4. The information transmission method according to claim 1, further comprising:
   obtaining instruction information including a reception area of the direct wave and the reflected wave from the server;
   determining whether the position identified in the identifying is within the reception area included in the instruction information; and
   receiving the direct wave and the reflected wave when the determining determines that the position is within the reception area,
   wherein the creating includes creating the delay profile of the reception of the direct wave and the reflected wave received in the receiving.

5. The information transmission method according to claim 1, further comprising:
   obtaining instruction information including a reception area of the direct wave and the reflected wave from the server;
   estimating a future position at which the mobile reception terminal will be within a predetermined period of time based on a current position of the mobile reception terminal;
   determining whether the future position estimated in the estimating is within the reception area included in the instruction information; and
   receiving the direct wave and the reflected wave once the current position of the mobile reception terminal is within the reception area, when the determining determines that the future position is within the reception area,
   wherein the creating includes creating the delay profile of the reception of the direct wave and the reflected wave received in the receiving.

6. The information transmission method according to claim 1,
   wherein the transmission station transmits the radio waves of the same modulation scheme using orthogonal frequency division multiplexing (OFDM) as the modulation scheme.

7. A mobile reception terminal comprising:
   a processor; and
   a memory storing a program,
   wherein, the program, when executed by the processor, causes the processor to:
   cause the mobile reception terminal to receive a direct wave and a reflected wave of radio waves transmitted by a transmission station that has a fixed position and transmits radio waves of a same modulation scheme continuously or periodically;
   create a delay profile of reception of the direct wave and the reflected wave, the delay profile indicating a time difference between the direct wave and the reflected wave;
   identify a position of the mobile reception terminal, the position corresponding to the reception of the direct wave and the reflected wave; and
   transmit the delay profile to a server over a network,
   wherein the processor transmits, to the server along with the delay profile, information related to the position identified, and
   the delay profile is used by the server to calculate a distance between the mobile reception terminal and a reflective object that reflected the reflected wave based on the time difference.

8. The mobile reception terminal according to claim 7,
   wherein the processor transmits, to the server along with the delay profile and the information related to the position identified, information related to reception times of the direct wave and the reflected wave.

9. The mobile reception terminal according to claim 7, wherein the executed program further causes the processor to:
   obtain instruction information including a reception area of the direct wave and the reflected wave from the server;
   determine whether the position identified is within the reception area included in the instruction information; and
   cause the mobile reception terminal to receive the direct wave and the reflected wave when the processor determines that the position is within the reception area,
   wherein the processor creates the delay profile of the reception of the direct wave and the reflected wave received.

10. The mobile reception terminal according to claim 7, wherein the executed program further causes the processor to:
  obtain instruction information including a reception area of the direct wave and the reflected wave from the server;
  estimate a future position at which the mobile reception terminal will be within a predetermined period of time based on a current position of the mobile reception terminal;
  determine whether the future position estimated is within the reception area included in the instruction information; and
  cause the mobile reception terminal to receive the direct wave and the reflected wave once the current position of the mobile reception terminal is within the reception area, when the processor determines that the future position is within the reception area,
  wherein the processor creates the delay profile of the reception of the direct wave and the reflected wave received.

11. The mobile reception terminal according to claim 7, wherein the processor transmits the delay profile at predetermined intervals.

* * * * *